(12) United States Patent
Kronfeld et al.

(10) Patent No.: US 9,956,880 B2
(45) Date of Patent: May 1, 2018

(54) VARIABLE RESISTANCE SERIAL HYBRID ELECTRIC BICYCLE

(71) Applicant: RahtMobile, LLC, St. Paul, MN (US)

(72) Inventors: Richard Kronfeld, Minneapolis, MN (US); Lyon Smith, Winona, MN (US); Russell Bockin, Eden Prairie, MN (US); Steve Castellotti, San Francisco, CA (US)

(73) Assignee: RahtMobile, LLC, St. Paul, MN (US)

( * ) Notice: Subject to any disclaimer, the term of this patent is extended or adjusted under 35 U.S.C. 154(b) by 0 days. days.

(21) Appl. No.: 15/361,875

(22) Filed: Nov. 28, 2016

(65) Prior Publication Data

US 2017/0158061 A1 Jun. 8, 2017

Related U.S. Application Data

(63) Continuation of application No. 14/300,883, filed on Jun. 10, 2014, now Pat. No. 9,505,310, which is a
(Continued)

(51) Int. Cl.
*B60L 11/00* (2006.01)
*B62M 6/40* (2010.01)
(Continued)

(52) U.S. Cl.
CPC .......... *B60L 11/007* (2013.01); *B60L 3/0046* (2013.01); *B60L 3/0061* (2013.01); *B60L 7/12* (2013.01);
(Continued)

(58) Field of Classification Search
None
See application file for complete search history.

(56) References Cited

U.S. PATENT DOCUMENTS

| 5,690,582 A | 11/1997 | Ulrich et al. |
| 6,021,862 A | 2/2000 | Sharan |

(Continued)

FOREIGN PATENT DOCUMENTS

| EP | 1614616 A2 | 1/2006 |
| JP | 2001114184 A | 4/2001 |

(Continued)

OTHER PUBLICATIONS

"Aero rider: Support Innovation", [Online]. Retrieved from the Internet: <URL: https://web.archive.org/web/20121109070726/http://www.aerorider.com/index.html>, (Jan. 2, 2013), 1 pg.

(Continued)

*Primary Examiner* — John D Walters
*Assistant Examiner* — Hilary L Johns
(74) *Attorney, Agent, or Firm* — Schwegman Lundberg & Woessner, P.A.

(57) ABSTRACT

A drivable exercise machine may include an electric vehicle with human power input provided by a high output, variable-resistance pedal-driven generator. The vehicle may include a computing device with a user interface that mimics an electric exercise bicycle. Using one or more program modes, a user may activate pre-set, custom and dynamic terrain-based exercise program profiles while commuting.

20 Claims, 38 Drawing Sheets

Related U.S. Application Data continuation-in-part of application No. 13/633,078, filed on Oct. 1, 2012, now abandoned.

(60) Provisional application No. 61/540,633, filed on Sep. 29, 2011, provisional application No. 61/870,229, filed on Aug. 26, 2013.

(51) Int. Cl.
| | |
|---|---|
| *B60L 7/12* | (2006.01) |
| *B60L 8/00* | (2006.01) |
| *B60L 11/16* | (2006.01) |
| *B60L 11/18* | (2006.01) |
| *B60L 3/00* | (2006.01) |
| *B60L 15/20* | (2006.01) |
| *B62M 6/85* | (2010.01) |
| *B62M 6/90* | (2010.01) |
| *B62M 6/60* | (2010.01) |
| *B62K 5/00* | (2013.01) |
| *B62K 5/08* | (2006.01) |

(52) U.S. Cl.
CPC .............. *B60L 8/003* (2013.01); *B60L 11/16* (2013.01); *B60L 11/1805* (2013.01); *B60L 11/1816* (2013.01); *B60L 15/2009* (2013.01); *B62K 5/00* (2013.01); *B62K 5/08* (2013.01); *B62M 6/40* (2013.01); *B62M 6/60* (2013.01); *B62M 6/85* (2013.01); *B62M 6/90* (2013.01); *B60L 2200/12* (2013.01); *B60L 2200/22* (2013.01); *B60L 2220/44* (2013.01); *B60L 2240/12* (2013.01); *B60L 2240/423* (2013.01); *B60L 2240/425* (2013.01); *B60L 2240/461* (2013.01); *B60L 2240/622* (2013.01); *B60L 2250/10* (2013.01); *B60L 2250/16* (2013.01); *B60L 2270/145* (2013.01); *B62K 2005/001* (2013.01); *Y02T 10/645* (2013.01); *Y02T 10/7005* (2013.01); *Y02T 10/7072* (2013.01); *Y02T 10/7083* (2013.01); *Y02T 10/72* (2013.01); *Y02T 10/7275* (2013.01); *Y02T 10/7291* (2013.01); *Y02T 90/14* (2013.01); *Y02T 90/16* (2013.01); *Y02T 90/162* (2013.01)

(56) References Cited

U.S. PATENT DOCUMENTS

| | | | |
|---|---|---|---|
| 6,087,806 A | 7/2000 | Fujioka | |
| 6,155,369 A | 12/2000 | Whittaker | |
| 6,196,347 B1 | 3/2001 | Chao et al. | |
| 6,445,080 B1 | 9/2002 | Daqoa et al. | |
| 6,450,922 B1 | 9/2002 | Henderson et al. | |
| 7,017,685 B2* | 3/2006 | Schoenberg | B60K 1/04 180/2.1 |
| 7,354,055 B2 | 4/2008 | Rasmussen | |
| 7,661,501 B1* | 2/2010 | Perdue | B62K 3/005 180/2.1 |
| 7,690,453 B2 | 4/2010 | Kinoshita et al. | |
| 8,256,554 B2* | 9/2012 | Chan | B62M 6/45 180/206.4 |
| 8,276,935 B2* | 10/2012 | Minato | B62B 7/062 280/47.38 |
| 9,505,310 B2* | 11/2016 | Kronfeld | B60L 11/007 |
| 2003/0217874 A1* | 11/2003 | Schoenberg | B60K 1/04 180/2.2 |
| 2007/0042868 A1* | 2/2007 | Fisher | A63B 24/0084 482/8 |
| 2008/0143292 A1 | 6/2008 | Ward | |
| 2009/0095552 A1 | 4/2009 | Gulas | |
| 2011/0144841 A1 | 6/2011 | Ruben | |
| 2011/0183793 A1* | 7/2011 | Chan | B62M 6/55 474/69 |
| 2012/0053804 A1 | 3/2012 | Saida et al. | |
| 2012/0168242 A1 | 7/2012 | Kulatunga | |
| 2012/0290160 A1 | 11/2012 | Mcvean | |
| 2013/0075176 A1 | 3/2013 | Chan | |
| 2013/0081892 A1 | 4/2013 | Kronfeld | |
| 2014/0353055 A1 | 12/2014 | Kronfeld et al. | |

FOREIGN PATENT DOCUMENTS

| | | |
|---|---|---|
| JP | 2002255081 A | 9/2002 |
| WO | WO-2010052236 A1 | 5/2010 |
| WO | WO-2015191536 A1 | 12/2015 |

OTHER PUBLICATIONS

"U.S. Appl. No. 13/633,078, Final Office Action dated Dec. 10, 2013", 10 pgs.

"U.S. Appl. No. 13/633,078, Non Final Office Action dated May 16, 2013", 8 pgs.

"U.S. Appl. No. 13/633,078, Response filed Sep. 16, 2013 to Non Final Office Action dated May 16, 2013", 8 pgs.

"U.S. Appl. No. 14/300,883, Examiner Interview Summary dated Sep. 24, 2015", 3 pgs.

"U.S. Appl. No. 14/300,883, Non Final Office Action dated Feb. 1, 2016", 10 pgs.

"U.S. Appl. No. 14/300,883, Non Final Office Action dated Jun. 26, 2015", 6 pgs.

"U.S. Appl. No. 14/300,883, Notice of Allowance dated Jun. 27, 2016", 5 pgs.

"U.S. Appl. No. 14/300,883, Response filed Jun. 1, 2016 to Non Final Office Action dated Feb. 1, 2016", 14 pgs.

"U.S. Appl. No. 14/300,883, Response filed Jun. 8, 2015 to Restriction Requirement dated Apr. 8, 2015", 8 pgs.

"U.S. Appl. No. 14/300,883, Restriction Requirement dated Apr. 8, 2015", 6 pgs.

"U.S. Appl. No. 14/300,883, Response filed Sep. 24, 2015 to Non Final Office Action dated Jun. 26, 2015", 8 pgs.

"D & H ENTERPRISES P/L Australia", www.dhenterprises.com.au, [Online] retrieved from the internet: <http://www.dhenterprises.com.au/gallery.htm>, (Jan. 2, 2013), 19 pgs.

"European Application Serial No. 15806472.5, Extended European Search Report dated Feb. 10, 2017", 11 pgs.

"Humancar Inc.", [Online] retrieved on the internet: <http://wayback.archive.org and http://www.humancar.com/>, (Jan. 2, 2013), 8 pgs.

"International Application Serial No. PCT/US2015/034839, International Preliminary Report on Patentability dated Dec. 22, 2016", 6 pgs.

"International Application Serial No. PCT/US2015/034839, International Search Report dated Aug. 25, 2015", 2 pgs.

"International Application Serial No. PCT/US2015/034839, Written Opinion dated Aug. 25, 2015", 4 pgs.

"Series Hybrid Electric Bike Compared to Traditional E-Bikes", Electric bike report, (Nov. 14, 2012), 1-19.

"TWIKE: Home Page", [Online] retrieved from the internet: <https://web.archive.org/web/20130406140434/http://www.twike.com/en/home/home.html>, (Jan. 2, 2013), 1 pg.

29 PGS, "Understanding Electric Bike Modes: Throttle vs. Pedal Assist (Pedelec) | Electric Bike Report | Electric Bike, Ebikes, Electric Bicycles, E Bike, Reviews", Electric bike report, (May 8, 2013), 29 pgs.

Blanco, Sebastian, "Auto Blog: HumanCar coming in Apr. with a $15,000 price tag", [Online]. Retrieved from the Internet: <URL: http://www.autoblog.com/2008/01/30/humancar-coming-in-april-with-a-15-000-price-tag/>, (Jan. 30, 2008), 7 pgs.

Rodrigo, D B, "ELF velomobile—a solar and pedal powered electric hybrid vehicle", [Online]. Retrieved from the Internet: <URL: http://www.designboom.com/technology/elf-a-solar-and-pedal-powered-electric-hybrid-vehicle-by-organic-transit/>, (Dec. 4, 2012), 12 pgs.

Sutton, Mark, "JD Group creates 'automatic' e-bike", [Online]. Retrieved from the Internet: <URL: http://www.bikebiz.com/news/

(56) References Cited

OTHER PUBLICATIONS read/jd-group-creates-automatic-e-bike/011471>, (Jul. 6, 2011), 2 pgs.

\* cited by examiner

VARIABLE RESISTANCE SERIAL HYBRID ELECTRIC BICYCLE

CROSS-REFERENCE TO RELATED APPLICATIONS

This patent application is a continuation of U.S. patent application Ser. No. 14/300,883, entitled "VARIABLE RESISTANCE SERIAL HYBRID ELECTRIC BICYCLE," filed Jun. 10, 2014, which is a continuation-in-part of U.S. patent application Ser. No. 13/633,078, entitled "HUMAN-RECHARGEABLE ELECTRIC VEHICLE," filed on Oct. 1, 2012, which claims the benefit of U.S. Provisional Application Serial No. 61/540,633, titled HUMAN-RECHARGEABLE ELECTRIC VEHICLE, filed Sep. 29, 2011 each of which is incorporated by reference herein in its entirety. This application also claims the benefit of U.S. Provisional Application Ser. No. 61/870,229, entitled "VARIABLE RESISTANCE SERIAL HYBRID ELECTRIC BICYCLE", filed Aug. 26, 2013, which is incorporated by reference herein in its entirety.

BACKGROUND

Many workers use a bicycle as the primary means of commuting to and from work. Bike commuting is a good alternative for many urban dwellers, but still impractical for most due to factors such as weather conditions and safety. People with longer commutes may have the desire to travel by bike, but simply can't because of the time/distance each way, every day. Each U.S. rush-hour conventional auto commuter spends on average 200 hours per year driving to and from work, plus an average of 36 hours a year stuck in traffic. This results in lost productivity and wasted fuel. Further, people incur substantial expense on exercise equipment and health club memberships.

SUMMARY

The present invention helps solve all of the aforementioned problems by producing an affordable electric vehicle fused with an enclosed recumbent exercise bicycle. The experience of bike commuting, previously reserved for the most passionate sub-culture of bikers, will be opened up to the rest of the population who have a hard time riding in the rain, cold, dark, or other road conditions. The carbon fiber body provides protection from the elements while this three-wheeled vehicle travels up to highway speeds powered by an in-wheel hub motor with sufficient range to reach the office, home or other desired location. Recharge is by standard household AC current, plus contribution from the integrated exercise pedals. Finally, a mobile platform with GPS navigation links exercise profiles selected by the user to pedal resistances, simulating the hills and course of any length of road in the world, even while stuck in traffic. The present invention will allow commuters to get their exercise during time that would otherwise be spent just sitting in a car. Bicycling can reduce transportation fatalities and promote health improvement.

The primary goal of the present invention is to provide a better bike commuter vehicle—a highway speed, covered, safe, one-or two-passenger, all weather, pedal recharging electric bike. The central challenges of this project are how to build a system to vary the resistance at the pedals (like an exercise bike), send all the power that the person generates to the batteries without throwing any of it away, and generate enough power so that the rider contributes to the system as much as possible.

In general terms, the present disclosure is directed to an electric vehicle. In one possible embodiment and by non-limiting example, the electric vehicle is a lightweight plug-in electric vehicle with human power input provided by a high output pedal-driven generator (the pedals are connected to a generator, not directly to the wheels). The electric current generated by the driver goes into the vehicle's overall system to be used for recharging the battery bank. The drivetrain is designed to increase and decrease pedal resistance, which translates into higher and lower levels of charging current to the battery. The entire charging system can be switched to outboard mode and thus provide on-demand portable electric power. The vehicle includes a computing device with a user interface that mimics an electric exercise bicycle, with both pre-set and custom exercise program profiles. Drive wheel(s) provide regenerative braking. A solar panel molded into the roof provides additional energy to the system. The disclosed vehicle is highway capable with a top speed of approximately 90 mph. The curb weight is approximately 600 pounds.

In one embodiment of the vehicle, the body is composed of carbon fiber. Recharge is by standard household AC current, plus contribution from the integrated exercise pedals. A tablet style mobile platform with GPS navigation links exercise profiles selected by the user or driver to pedal resistances, simulating the hills and course of any length of road in the world, even while stuck in traffic.

Reference is made throughout the present disclosure to certain aspects of one embodiment of the vehicle described herein. Such references to aspects of the presently described vehicle do not limit the scope of the claims attached hereto. Additionally, any examples set forth in this disclosure are not intended to be limiting and merely set forth some of the many possible embodiments for the appended claims. It is to be understood that the phraseology and terminology used herein are for the purpose of description and should not be regarded as limiting.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 28 shows the interior of one embodiment of the present invention with foam reinforcements before final layer of carbon fiber and resin was laid in.

DETAILED DESCRIPTION

Figure 1:
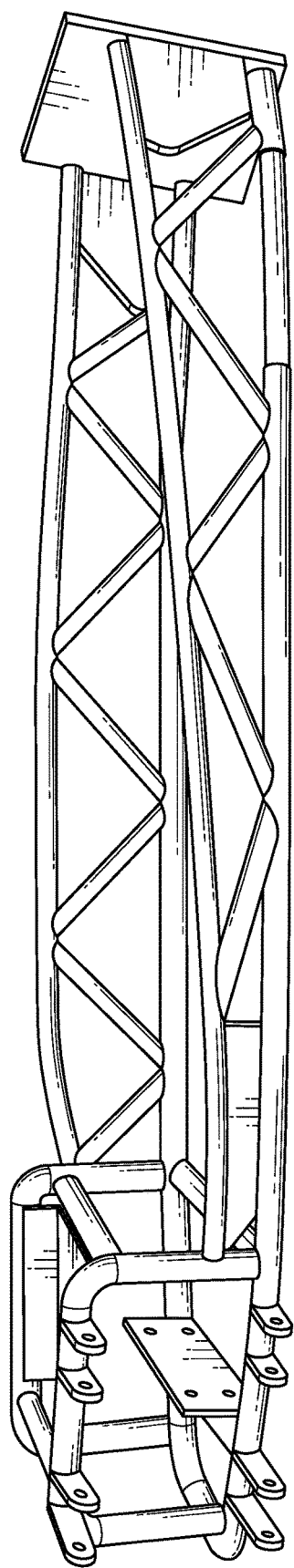
FIG. 1 is a side view of 1" basic tubular aluminum frame without suspension according to one embodiment of the present invention.
Figure 2:
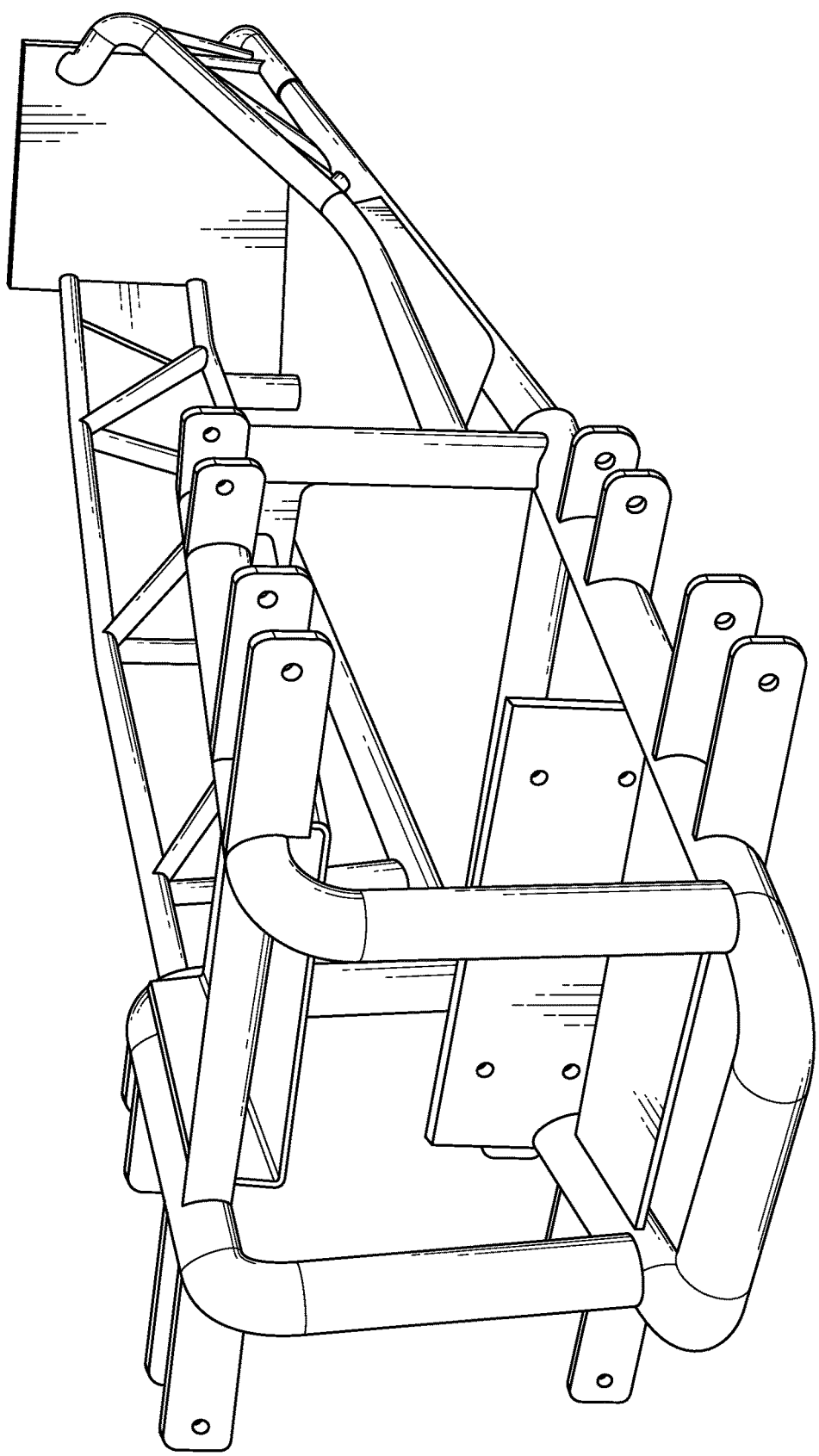
FIG. 2 is a front view of 1" basic tubular aluminum frame without suspension according to one embodiment of the present invention.
Figure 3:
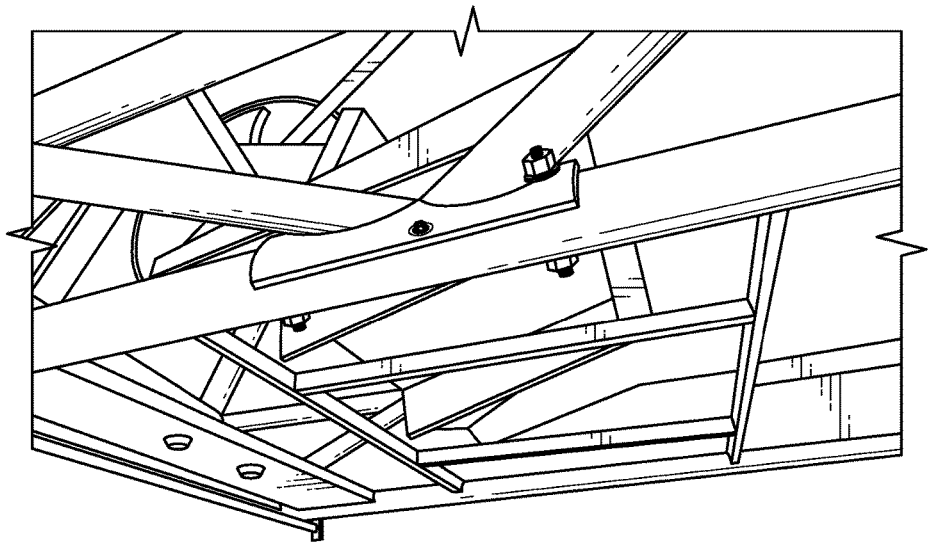
FIG. 3 is a close up view of 1" tubular aluminum frame with battery box in place according to one embodiment of the present invention.
Figure 4:
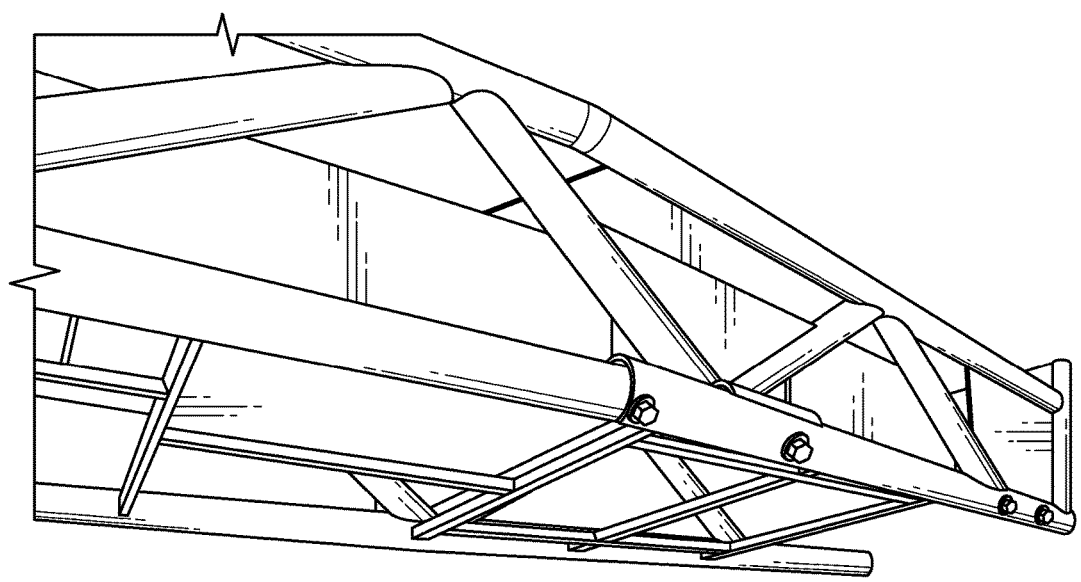
FIG. 4 is a close up view of 1" basic tubular aluminum frame with battery box in place according to one embodiment of the present invention.
Figure 5:
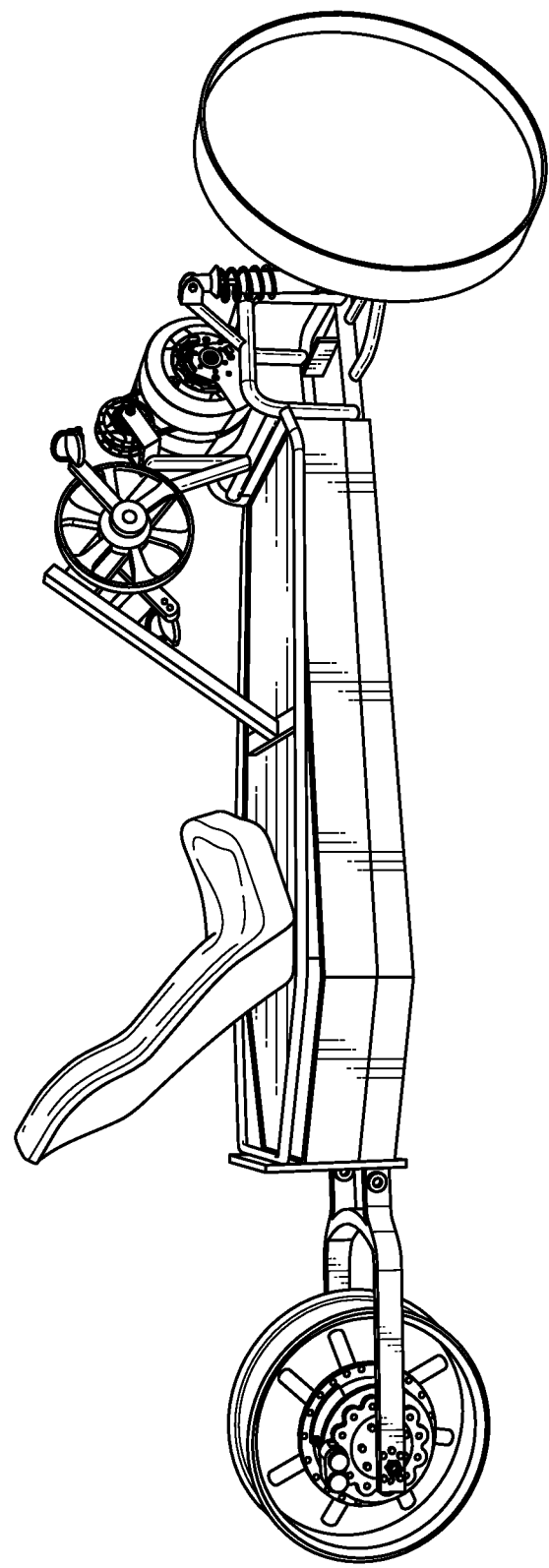
FIG. 5 shows seat on top of the battery box according to one embodiment of the present invention.
Figure 6:
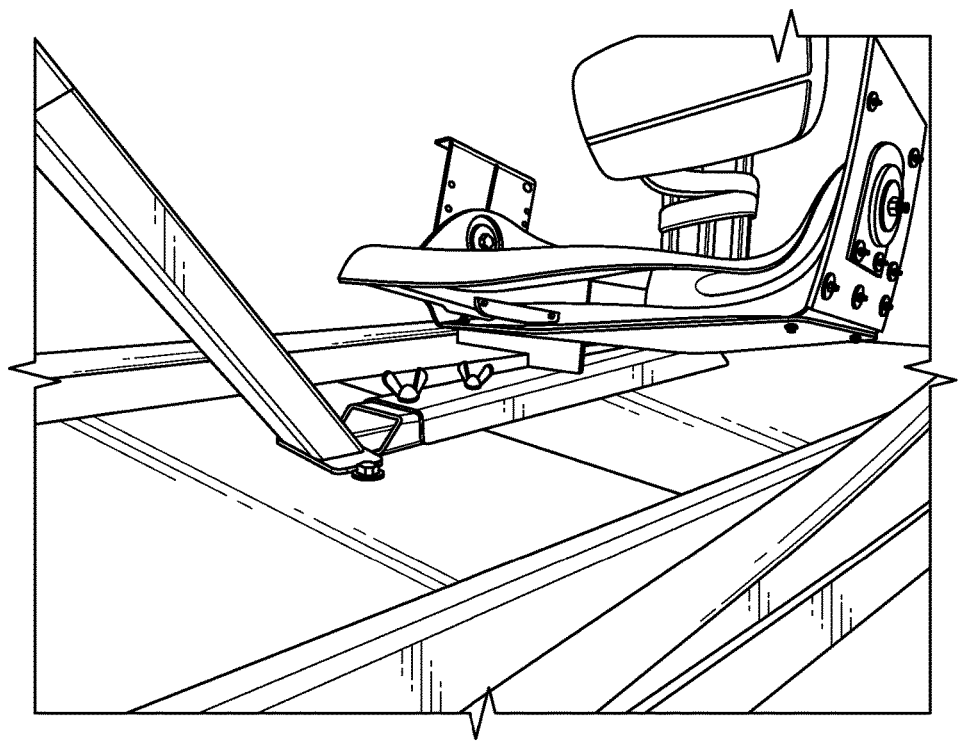
FIG. 6 is a close up view of the seat attached to top of the battery box, according to one embodiment of the present invention.
Figure 7:
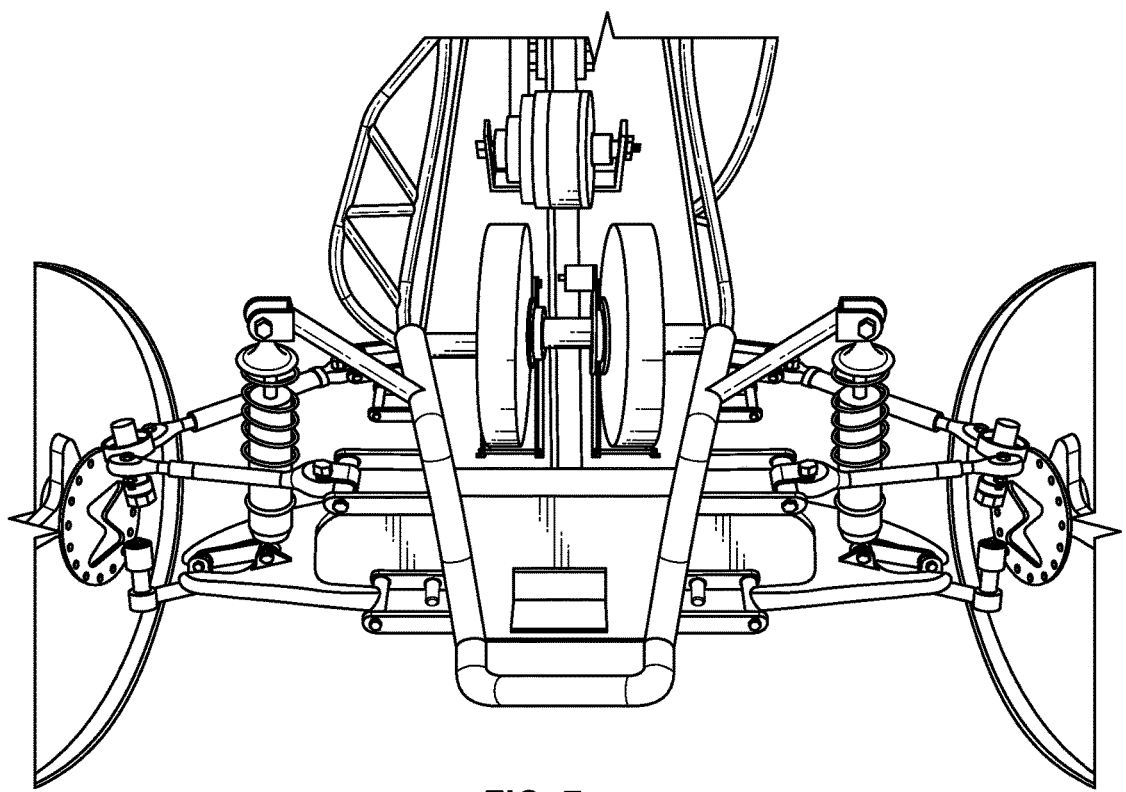
FIG. 7 shows front chassis detail with generator system in place according to one embodiment of the present invention.
Figure 8:
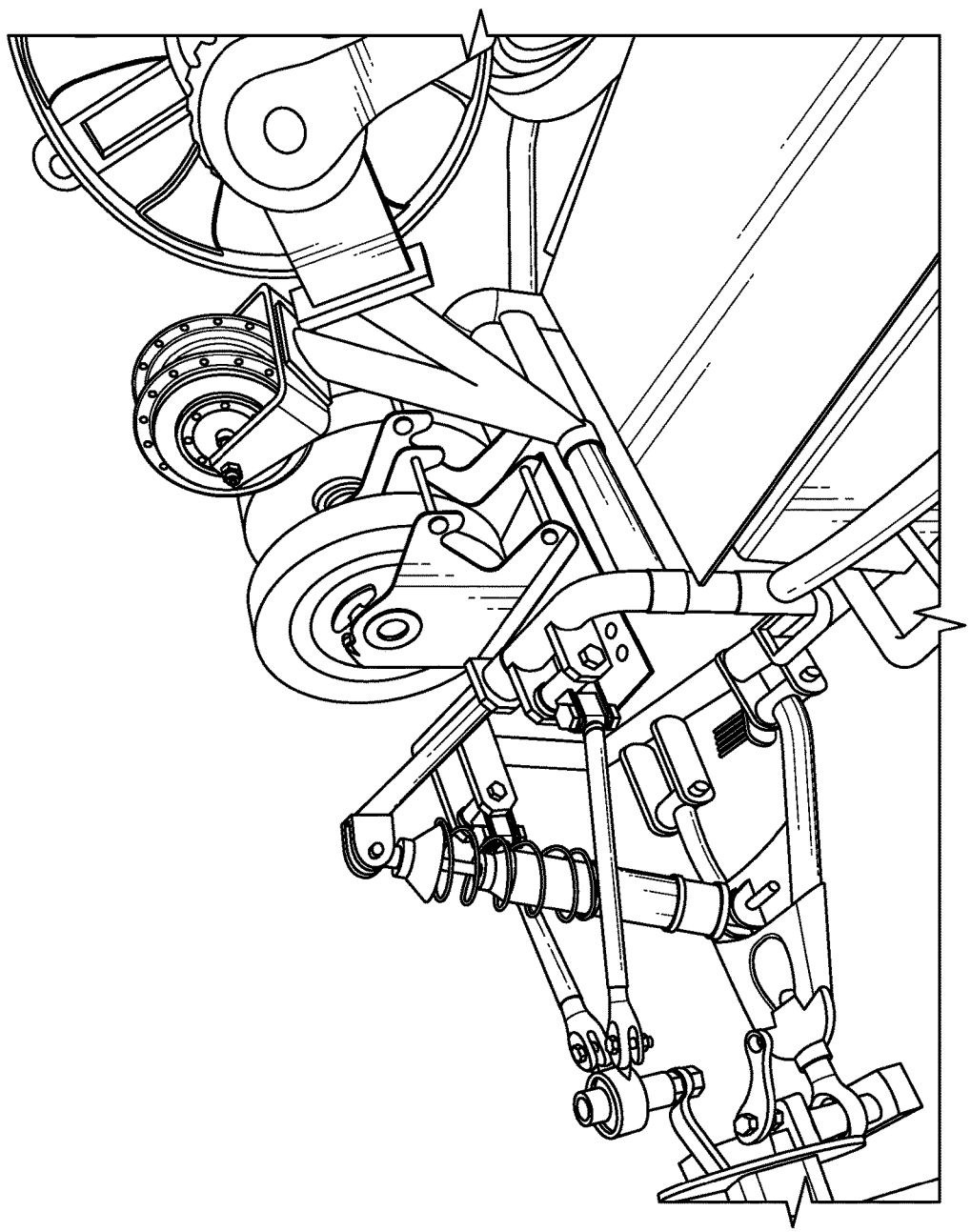
FIG. 8 shows front chassis detail of one embodiment of the present invention from reverse angle.
Figure 9:
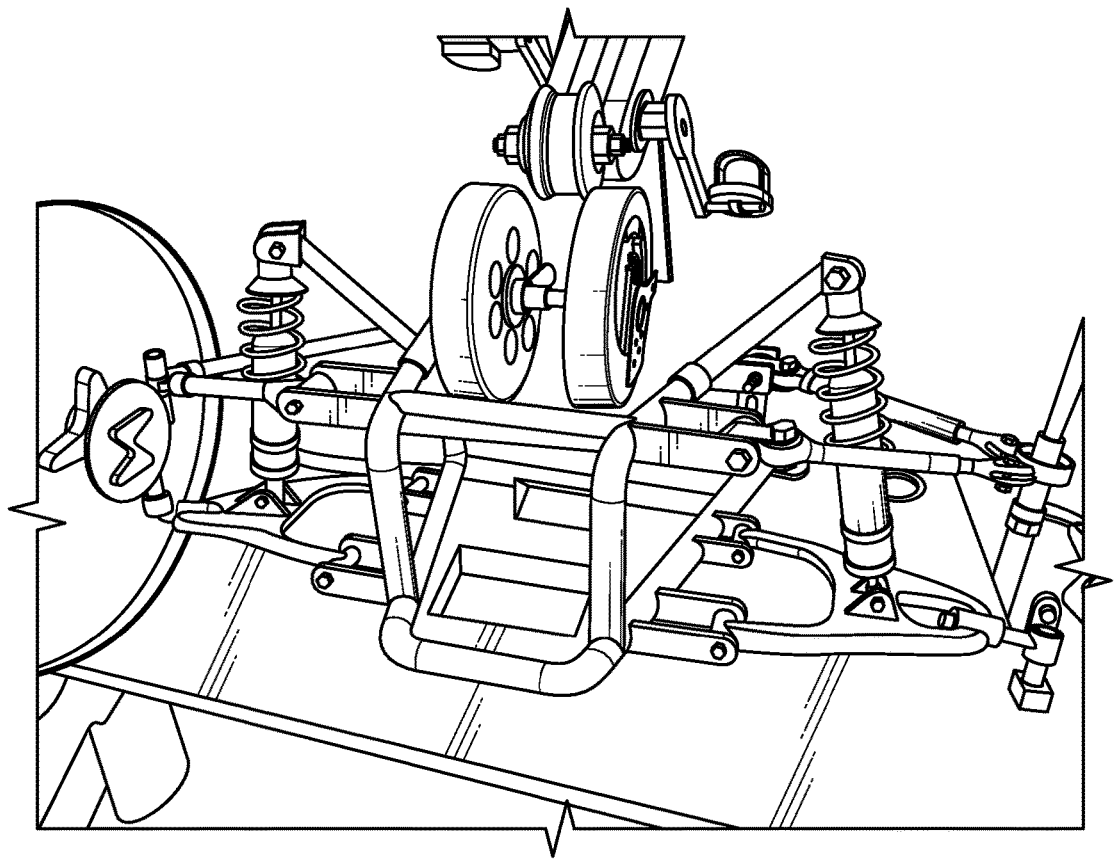
FIG. 9 shows front end chassis detail according to one embodiment of the present invention.
Figure 10:
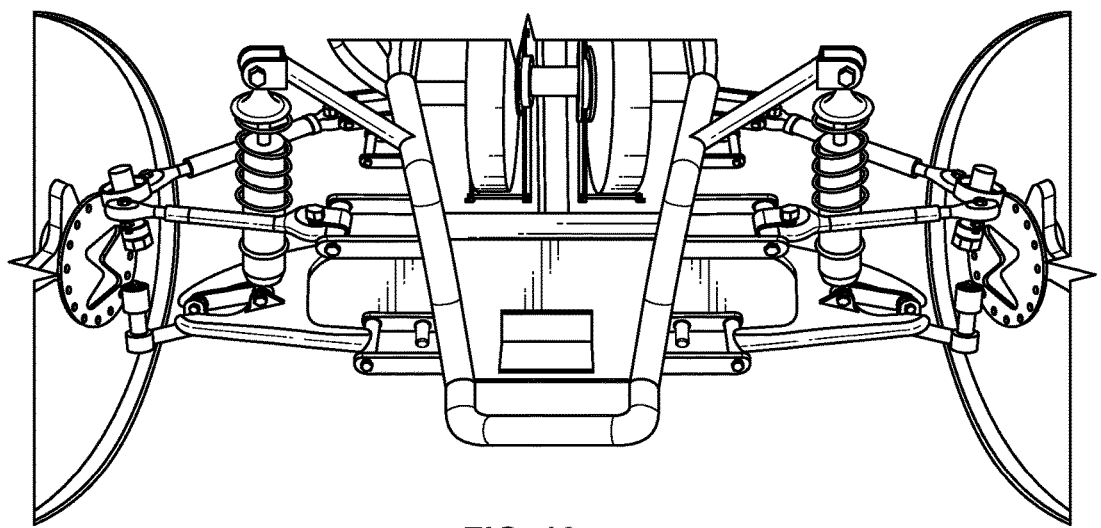
FIG. 10 shows front end chassis detail according to one embodiment of the present invention.
Figure 11:
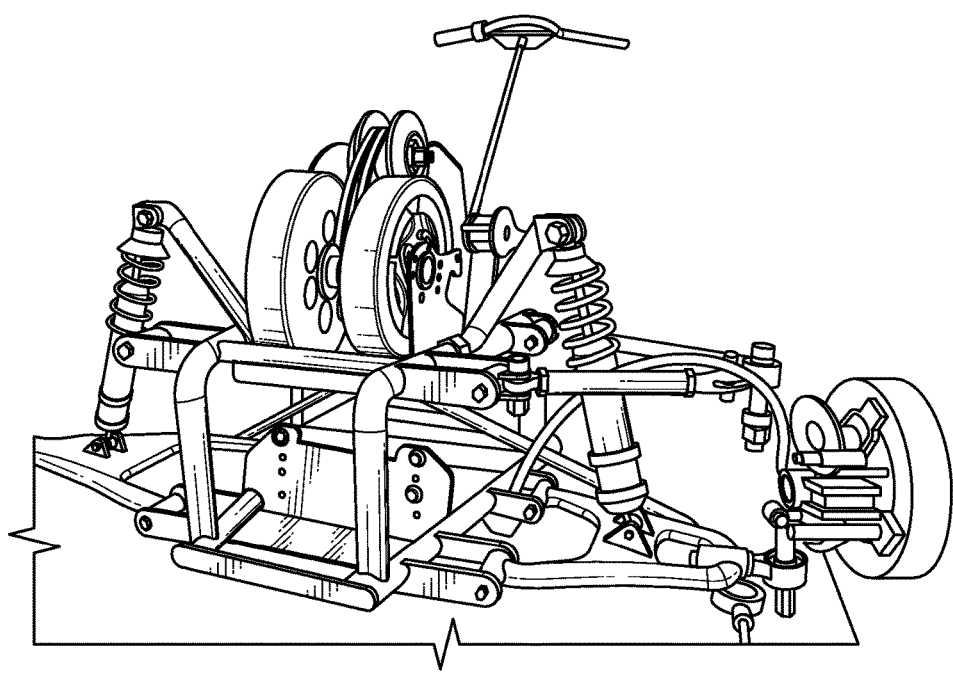
FIG. 11 shows front end chassis according to one embodiment of the present invention.
Figure 12:
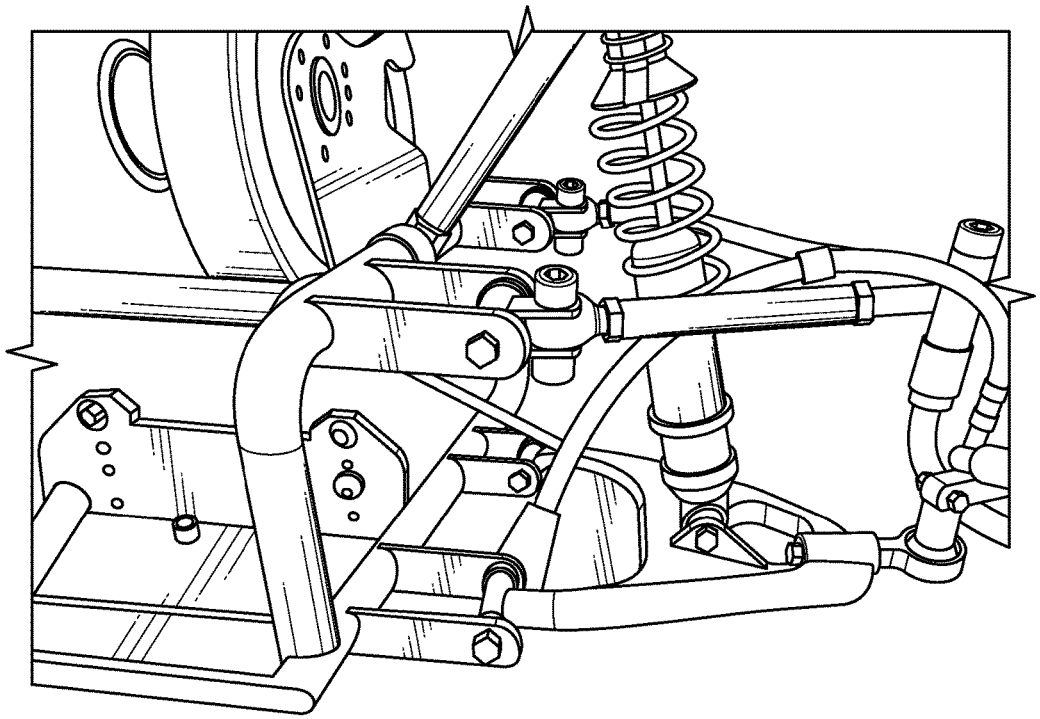
FIG. 12 shows front end chassis detail according to one embodiment of the present invention.
Figure 13:
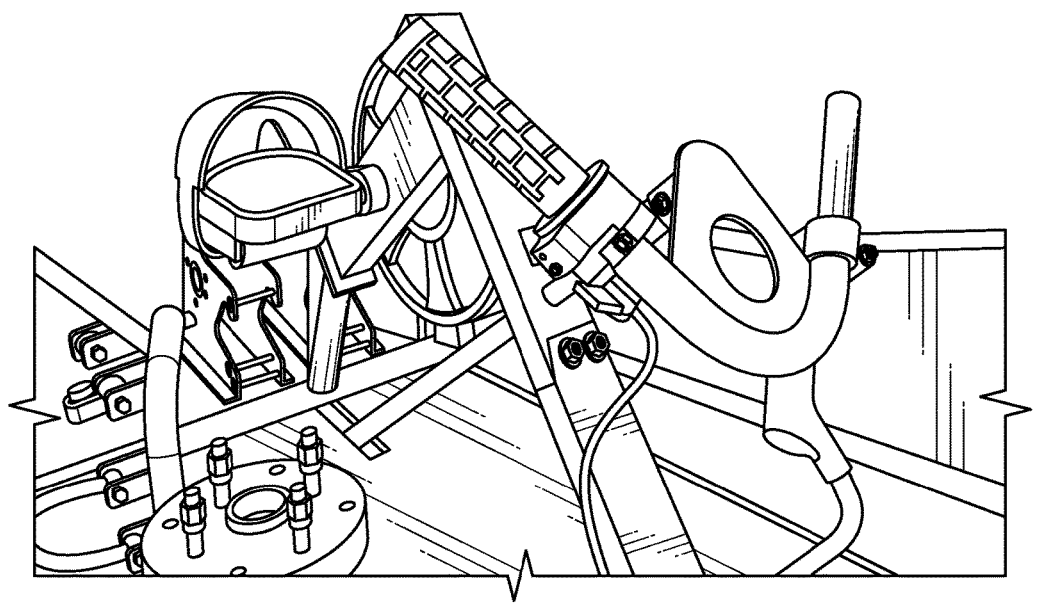
FIG. 13 shows steering wheel and column angled down to front end according to one embodiment of the present invention.
Figure 14:
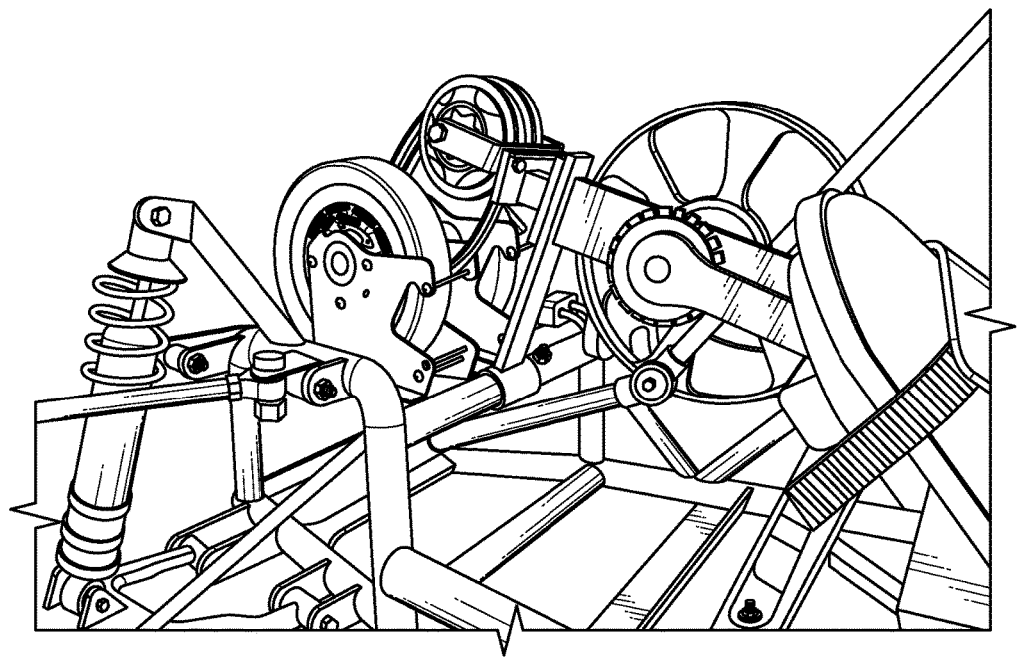
FIG. 14 shows the steering column in top right of frame pointed downward where it is jointed before it goes into the rods attached to the wheels, according to one embodiment of the present invention.
Figure 15:
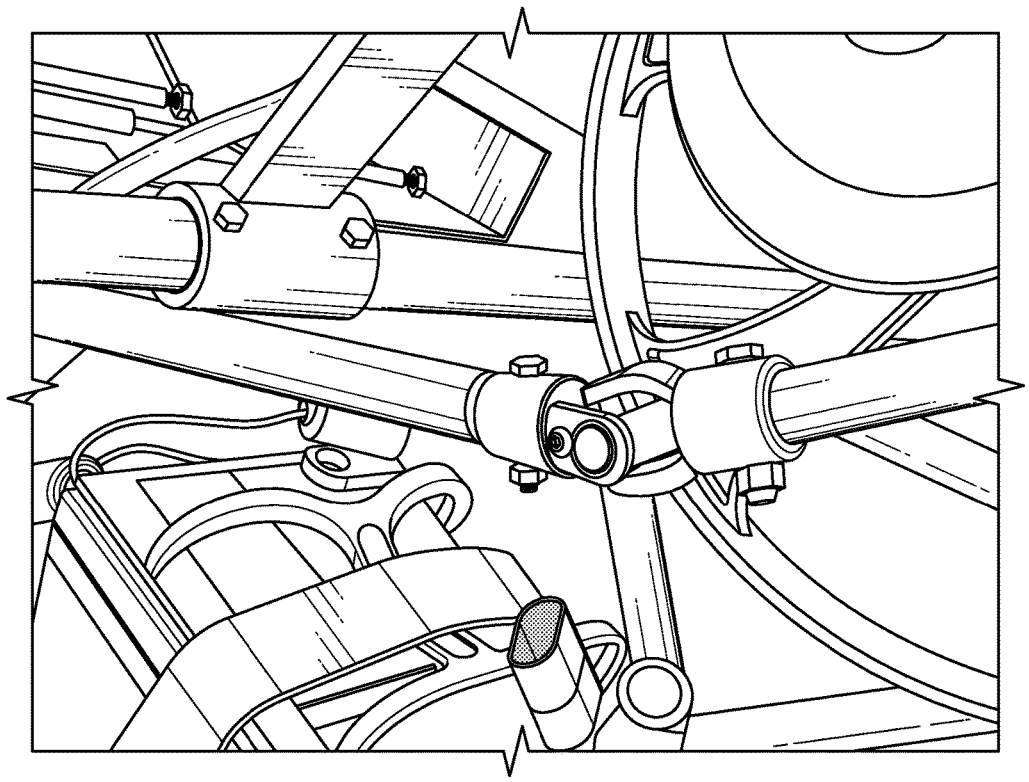
FIG. 15 shows close up of the steering column going through middle of the frame with universal joint according to one embodiment of the present invention.
Figure 16:
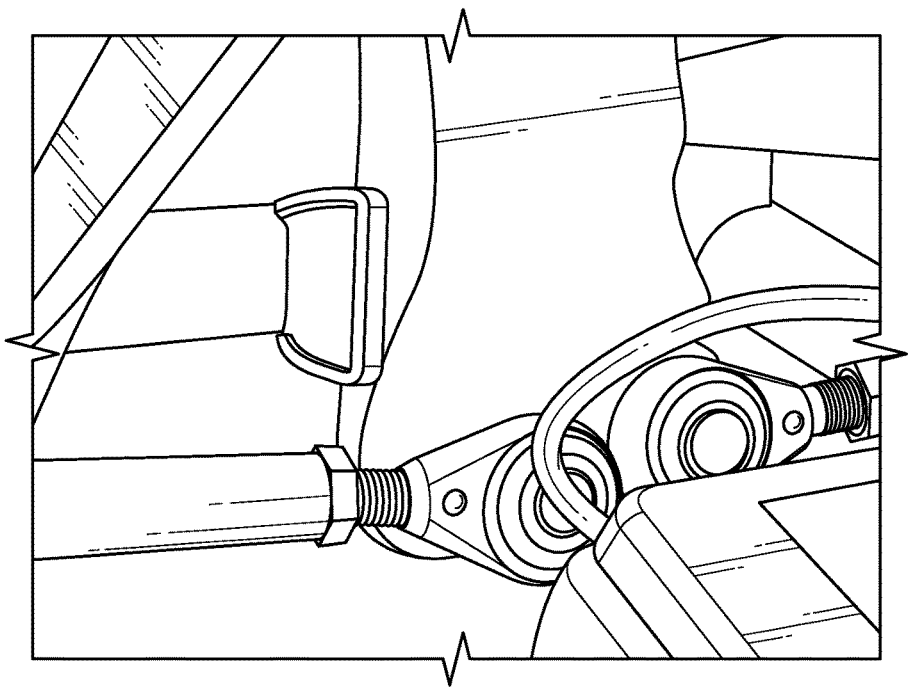
FIG. 16 shows where the steering column attaches with two hinged joints where rods attach which go out to the wheels, according to one embodiment of the present invention.
Figure 17:
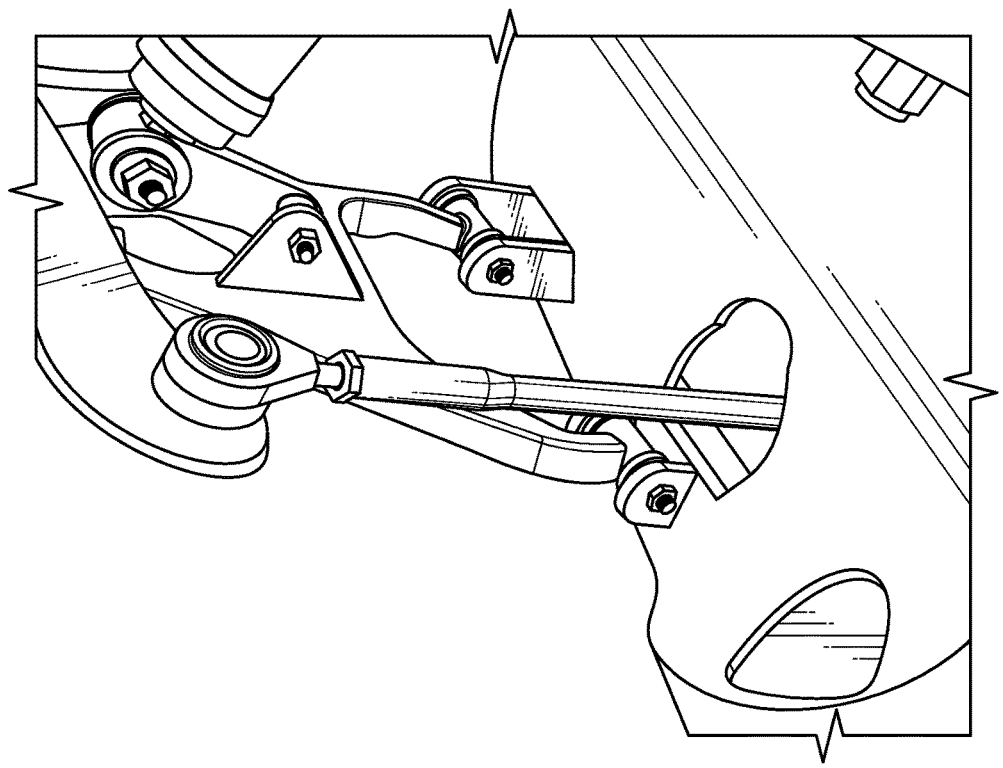
FIG. 17 shows the left side steering rod extended out through the body to the joint at the wheel for turning the wheel, according to one embodiment of the present invention.
Figure 18:
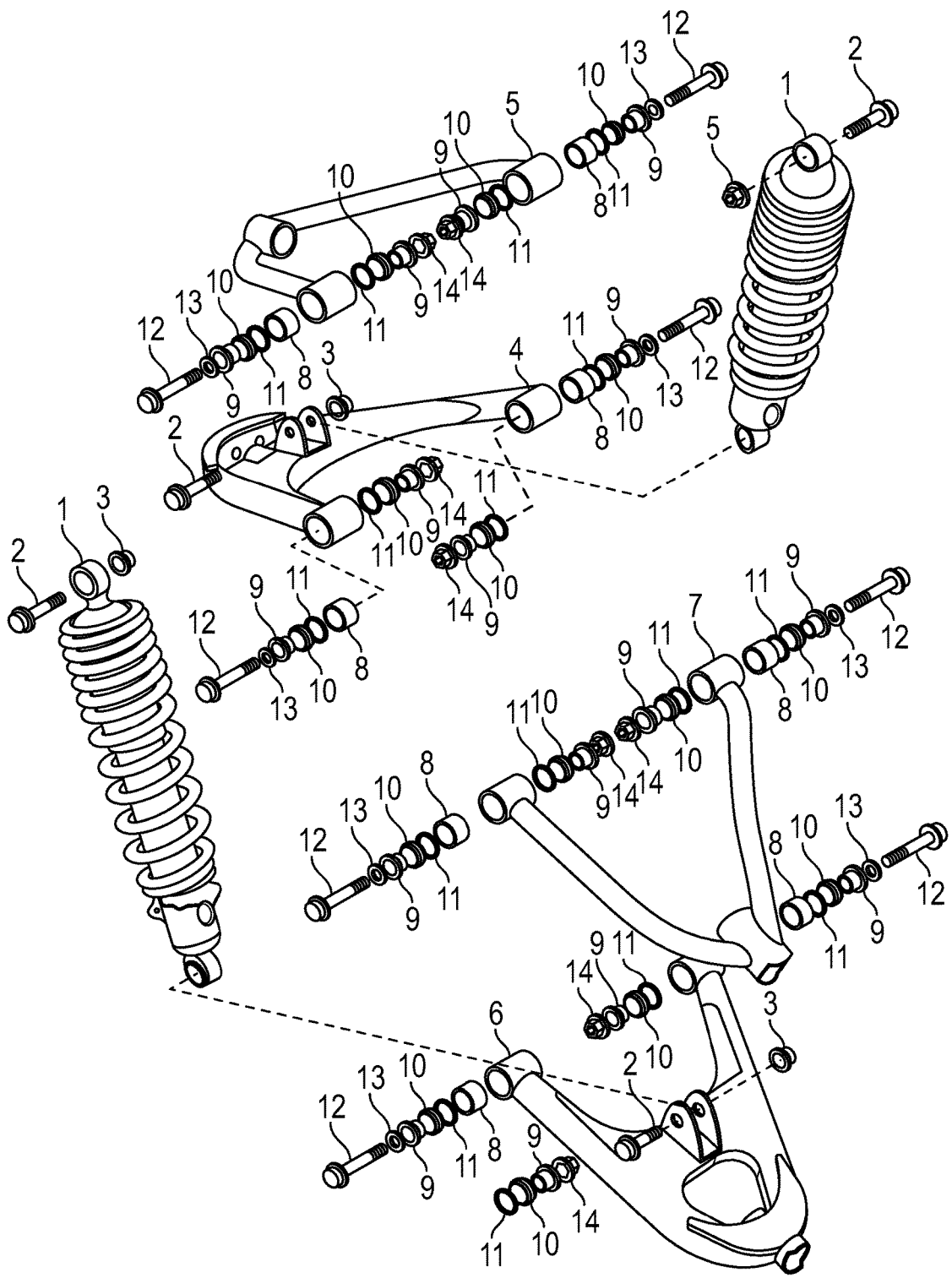
FIG. 18 is a schematic of the front end suspension according to one embodiment of the present invention.

Various embodiments are described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

FIGS. 1 through 6 illustrate the frame of one embodiment of the wheeled vehicle, hereafter, the vehicle 100, in images shown from different angles. The frame is composed of 1" diameter hollow aluminum tubing, welded together. An aluminum battery box made of ⅛" thick aluminum sheet metal is located at the bottom of the frame in the center of the vehicle. A ¼" thick aluminum sheet metal plate is bolted onto the frame rails on top of the battery box. The battery box is located here because it is the lowest center of gravity for the vehicle.

FIGS. 7 through 18 illustrate the front suspension 700 of one embodiment of the vehicle in images shown from different angles. The front suspension 700 is composed of an A-arm 702 on each side, 2 tie-rods 704 on each side, a shock absorber 706, and a braking system including a 5" diameter hydraulic disk brake 708 on each side, and wheel hubs 712 on each side. A lever 714 on the left side of the steering wheel actuates both front left and front right hydraulic disk brakes 708. The steering system can be a Mechanical Quadrant type configuration and consists of rods 716 attached to a central steeling column 718 on one end and attached to a steel tab 720 on the other end. Each of the rods 716 is connected to a bearing 722 on respective sides of the front end 700. Thus the front end rotates to turn the wheels to steer, or exert directional control, over the wheeled vehicle during operation.

The vehicle 100 can include a front suspension where the wheels 104 move from a first position to a second position. For example, a user can change the configuration of the front suspension from the first position where the distance between the wheels 104 along an axis parallel to the centers of the wheels 104 is at a maximum, such as when driving to enhance vehicle stability, to the second position where the distance between the wheels 104 is at a minimum, such as when parking to minimize area occupied by the vehicle 100.

In an example, the vehicle 100 can include a lifting and sliding mechanism to move the front suspension from a first position to a second position. For example, a crank, which can be located in a compartment in the front of the vehicle, above the front suspension, can fold out. As the crank is turned, a caster at the end of a support post is slowly lowered to the ground from the midpoint of the front suspension. The operation of the support post is much like the support for a trailer hitch that is cranked downward to lift the trailer over the top of the hitch ball.

As the support post is lowered, a worm gear simultaneously pulls the two sides of the front suspension inward. The entire assemblies of the left and right side a-arms, struts and shock absorbers turn inward toward the body of the vehicle. Both left and right front suspension assemblies are hinged at the midpoint of the frame. The left and right front suspension assemblies tilt inward as the worm gear pulls the tops of the assemblies together. Once the support post reaches the ground, the load and weight of the front end of the vehicle 100 is transferred from the left and right front suspension assemblies to the support post. The user continues to crank until the front wheels 104 are up against the body of the vehicle.

Figure 19:
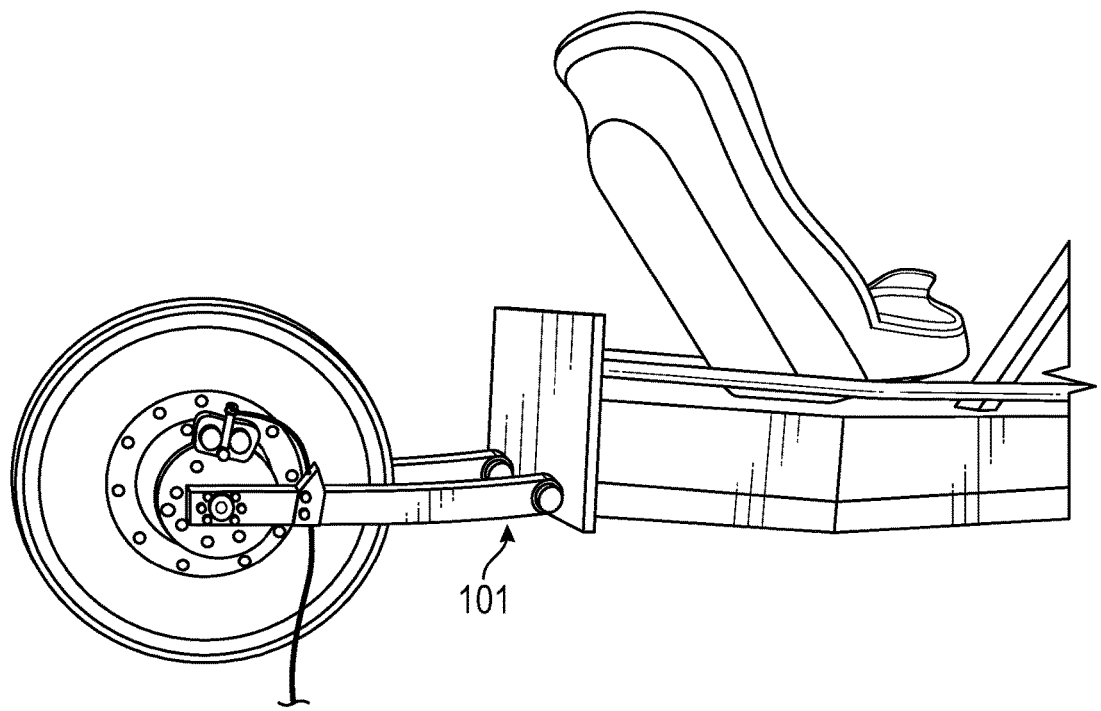
FIG. 19 shows a rear swing arm attached to the metal plate before shocks and springs are attached according to one embodiment of the present invention.
Figure 20:
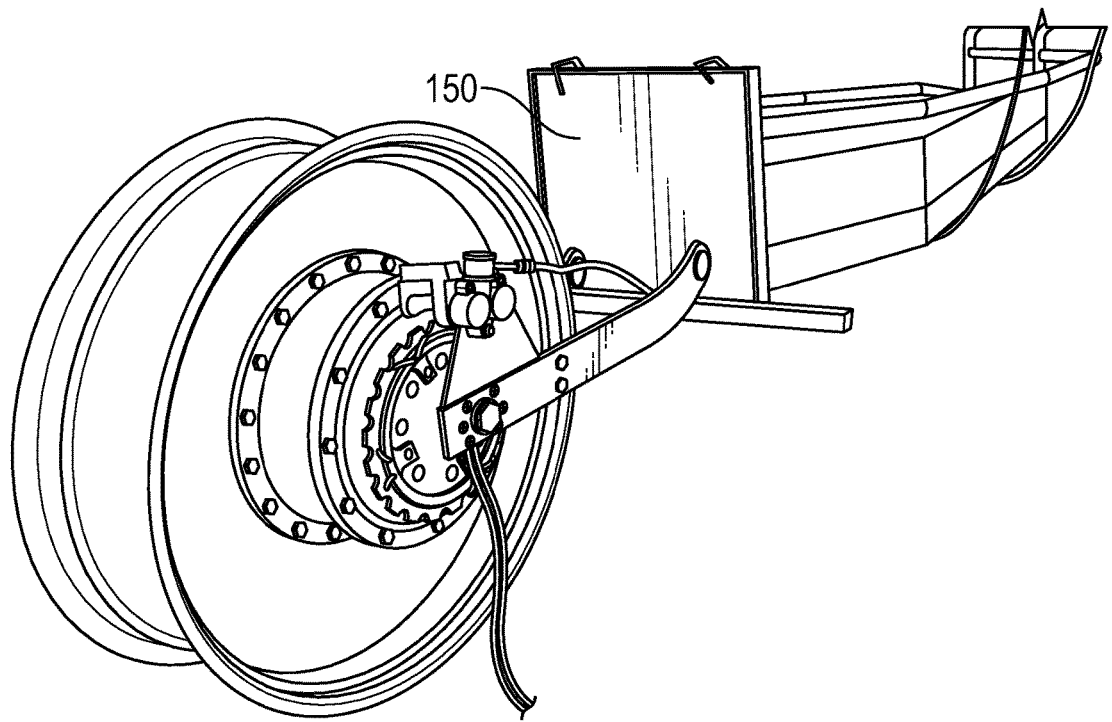
FIG. 20 shows a rear view of rear wheel connected to swing arm, connected to rear metal plate according to one embodiment of the present invention.
Figure 21:
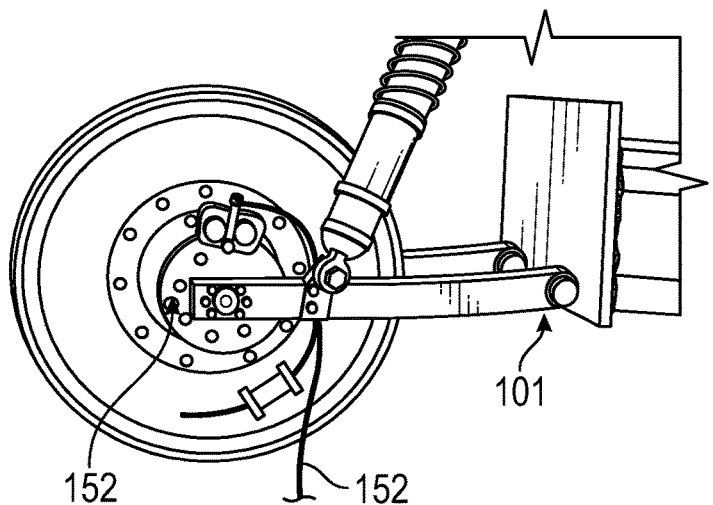
FIG. 21 shows close view of rear suspension according to one embodiment of the present invention, including wheel, swing arm and shock.
Figure 22:
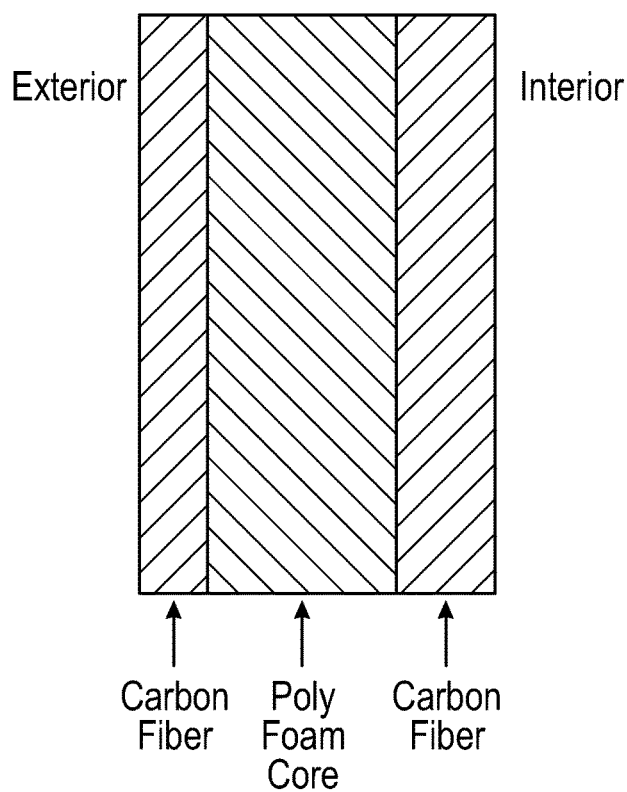
FIG. 22 shows an illustrated cutaway of the composite body according to one embodiment of the present invention.

FIGS. 19 through 21 illustrate the rear suspension of one embodiment of the vehicle 100 in images shown from different angles. The rear wheel is connected to the frame via a welded steel swing arm 101 (see FIGS. 19 and 21). For strength, the swing arm 101 is hinged to a ½" thick aluminum plate 150 in the rear of the frame (see FIG. 20). One shock absorber 103 on each side of the swing arm 101 is connected to the frame (see FIG. 21). An 8" disk hydraulic brake 152 is part of the rear end suspension (see FIG. 21). A lever on the steering wheel on the right side actuates the rear brake.

FIGS. 22 through 32 illustrate the body of the vehicle. In one embodiment, the vehicle body is made of layers of carbon fiber and flexible structural foam core (see FIGS. 22 and 28). Structural mount points and body strength will be achieved through sandwiching the foam core between layers of the carbon fiber. The thickness of the body is approximately ¼". Alternatively, the body could be made of other lightweight metal or composite materials, such as KEVLAR, aluminum or fiberglass. The vehicle body is, in a preferred embodiment, a single piece for greatly increased strength. It is lightweight, durable and aesthetically appealing.

Figure 23:
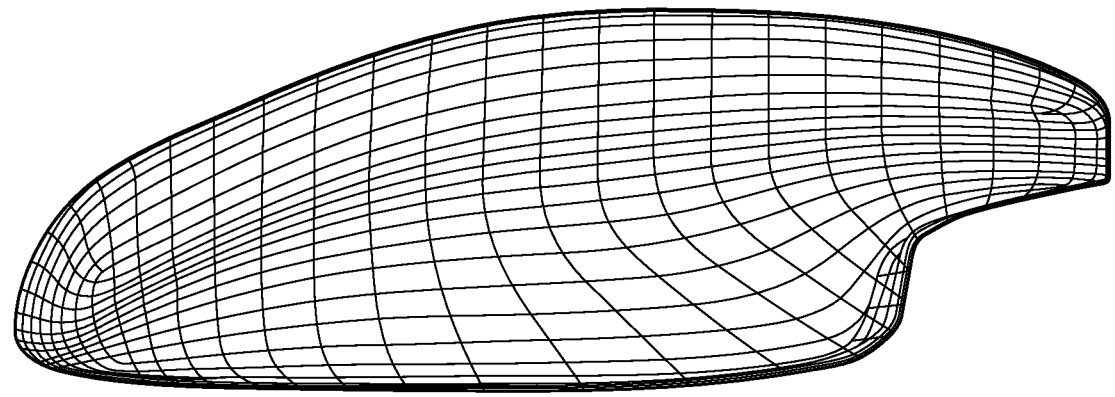
FIG. 23 shows possible dimensions of the body from a side view, according to one embodiment of the present invention.
Figure 24:
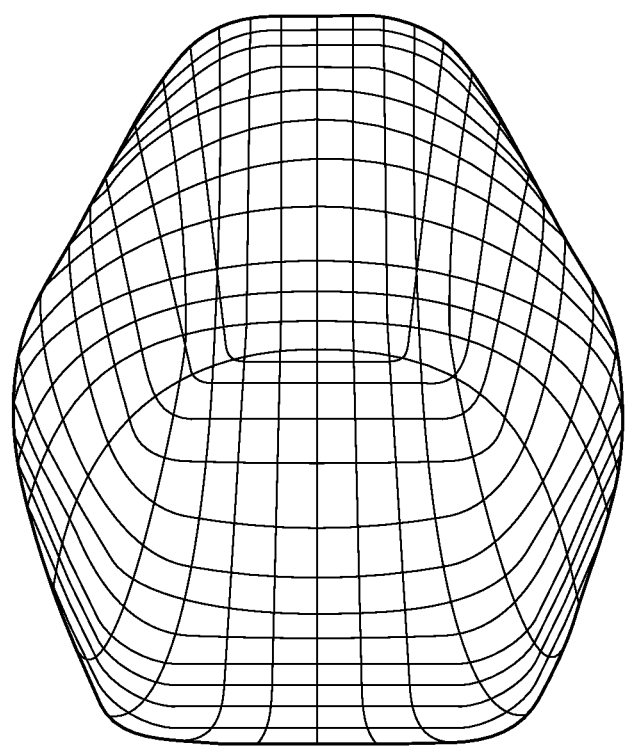
FIG. 24 shows possible dimensions of the body from a front view, according to one embodiment of the present invention.
Figure 25:
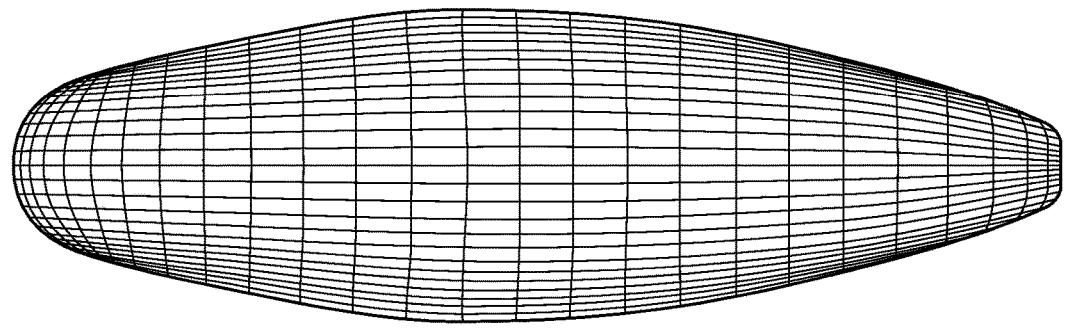
FIG. 25 shows possible dimensions of the body from a top view, according to one embodiment of the present invention.
Figure 26:
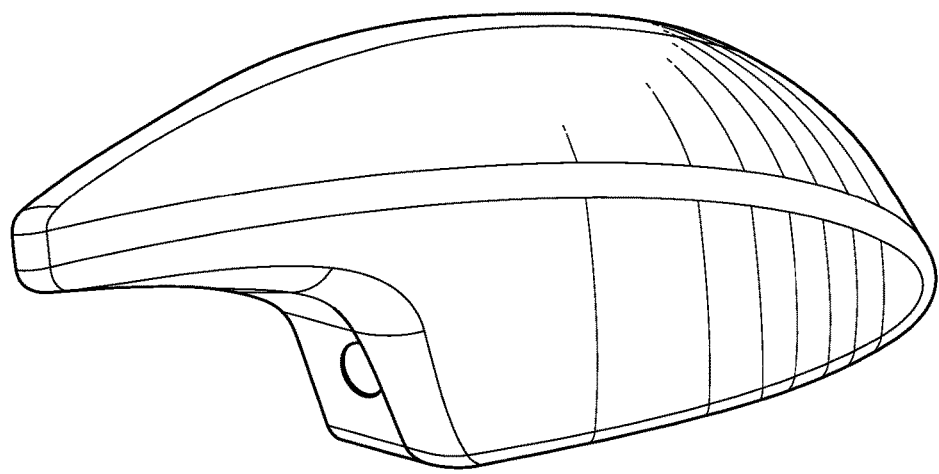
FIG. 26 is a rear right ¼ side view of the body of the vehicle according to one embodiment of the present invention.
Figure 27:
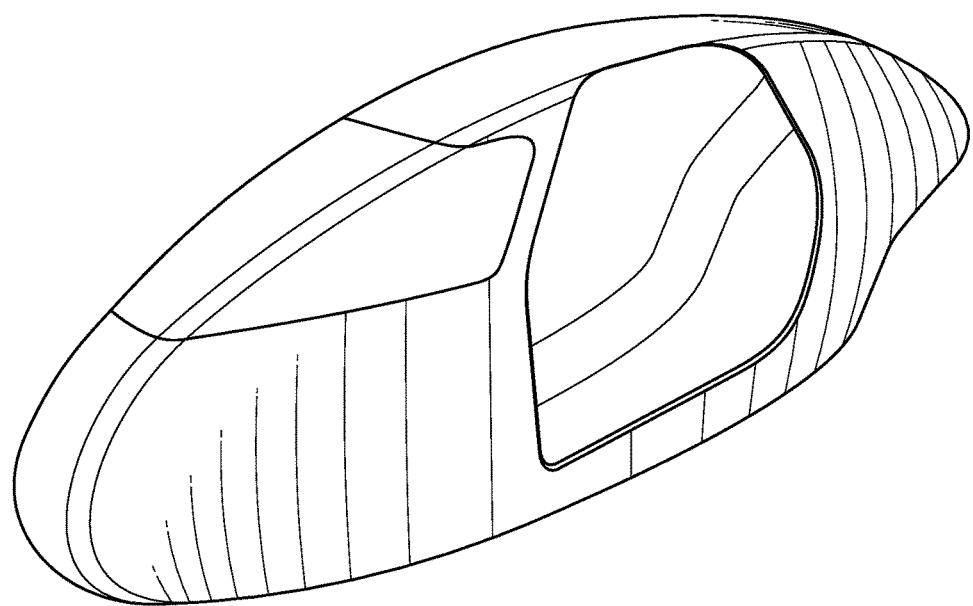
FIG. 27 shows one embodiment of the body of the present invention just after door cut out was made.
Figure 28:
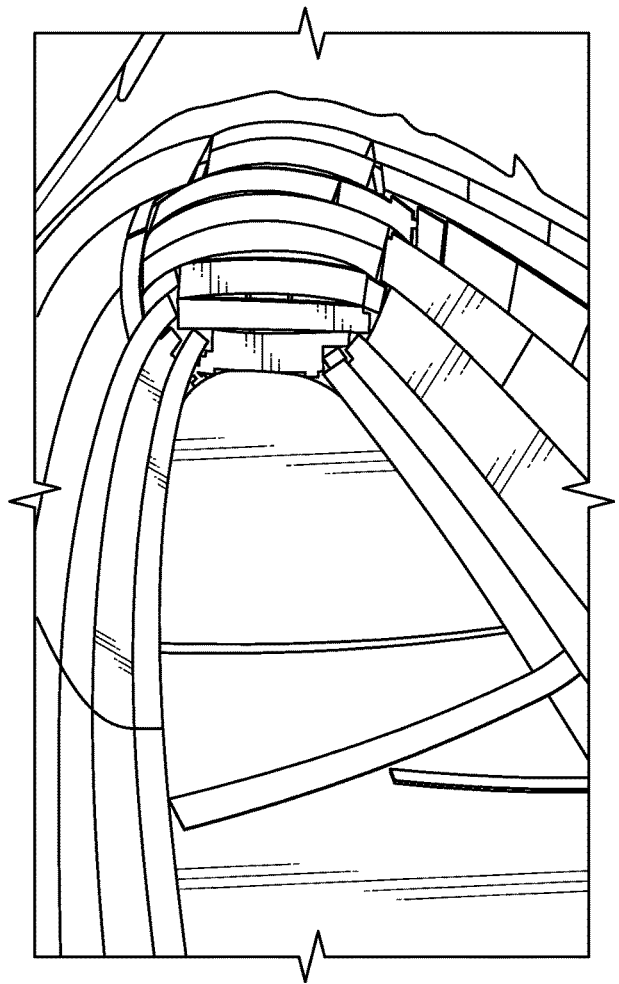
Figure 29:
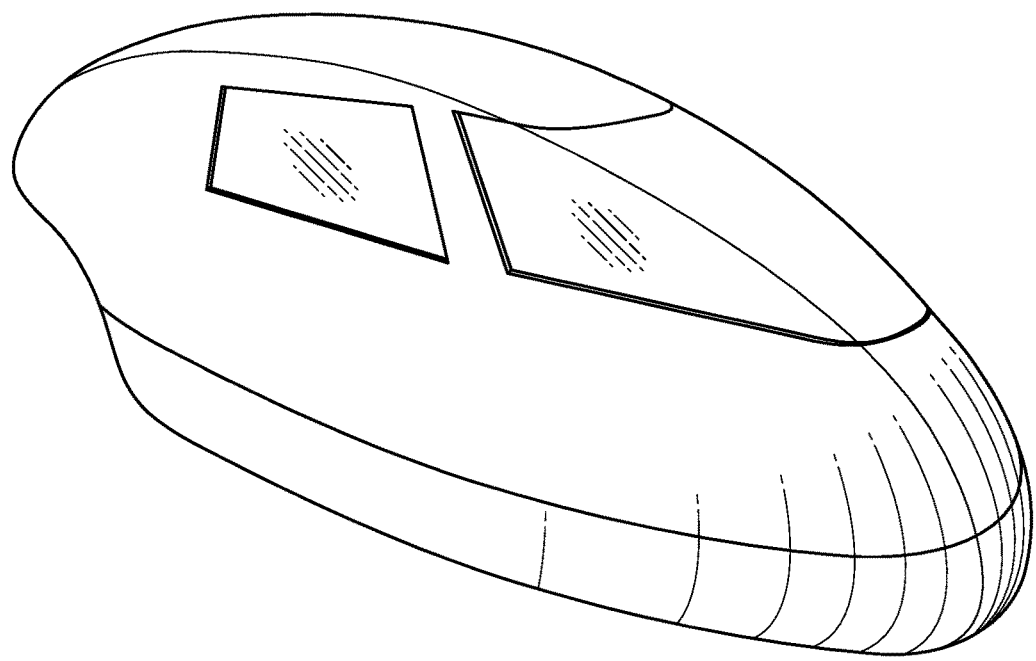
FIG. 29 shows a side view of one embodiment of the body with door and windshield cutouts.
Figure 30:
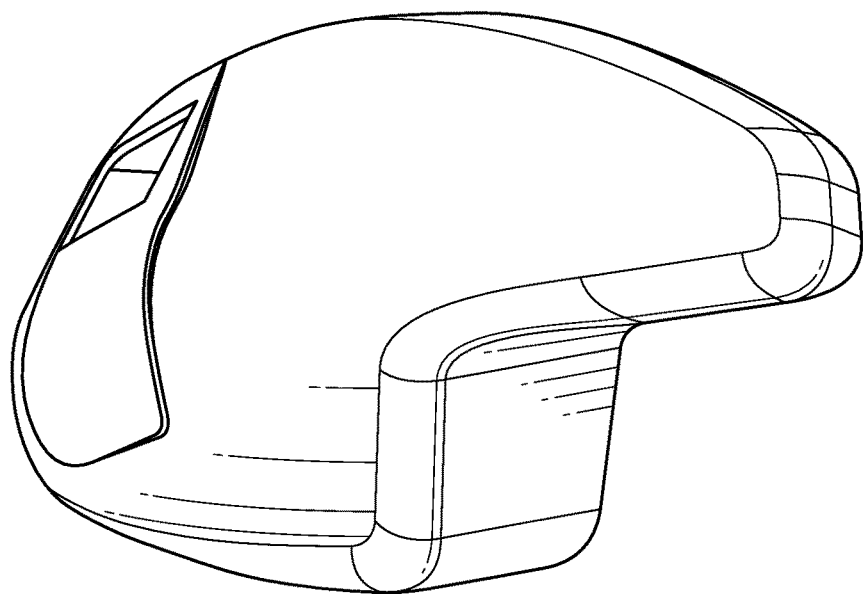
FIG. 30 shows a rear left side view of one embodiment of the body with door installed.
Figure 31:
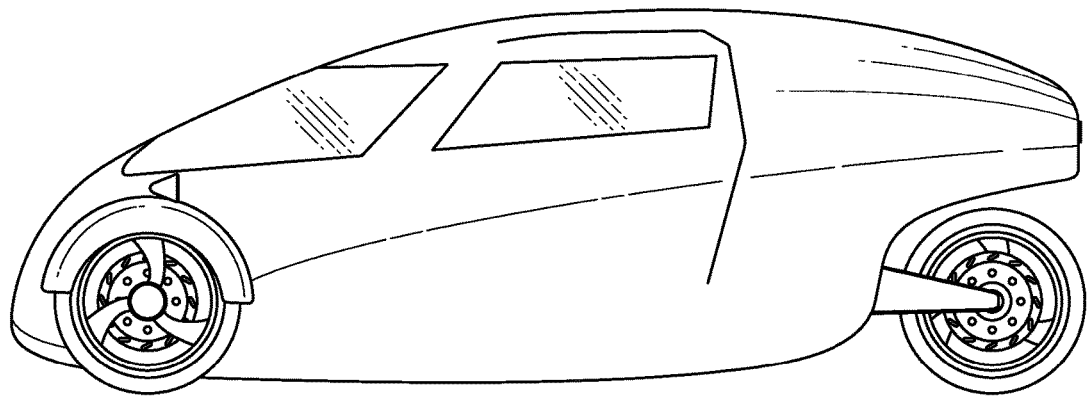
FIG. 31 is a side view of one embodiment of the presently disclosed vehicle.
Figure 32:
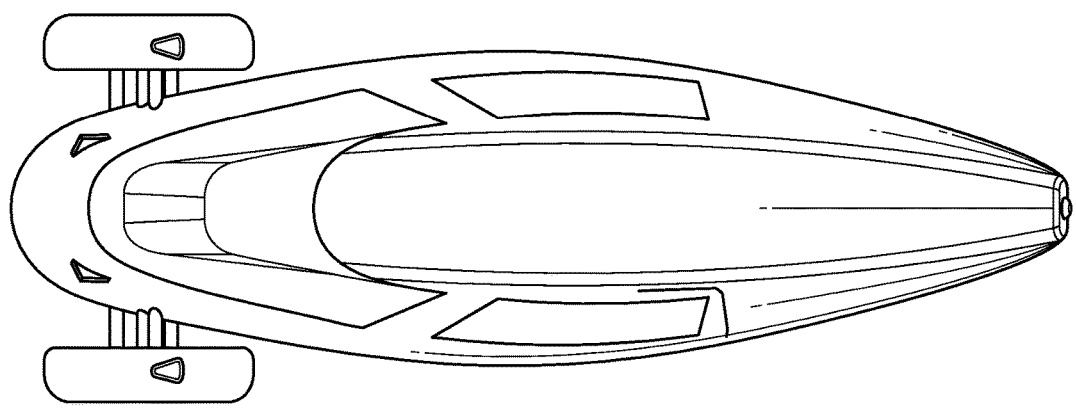
FIG. 32 is a top view of one embodiment of the presently disclosed vehicle.

In one embodiment, the vehicle's body has external dimensions as noted in FIGS. 23 through 25. These dimensions permit a range of user or driver body dimensions to be sized for different body types, whether a child or small adult, or a larger adult.

The vehicle body is designed in an elongated, semi-ovoid shape in the form depicted in FIGS. 26, 27, and 29 through 32. The shape depicted is low profile and permits low aerodynamic drag.

Further, the vehicle's exterior color could be varied to match those of user preference. Depending on the vehicle body material, the color could be integrated into the body material or applied the body exterior.

In one embodiment, the electric vehicle uses an internal hub, brushless DC motor, including two separate motor windings 105 (see FIG. 33) and housing 106 for the motor windings, with a peak power of 50 KW and constant power of 20 KW, 100A-300A (19-24 Hp), 10 RPM/Volt. Placing the motor in the wheel hub increases efficiency, saves space and reduces complexity by utilizing a smaller number of moving parts.

Figure 33:
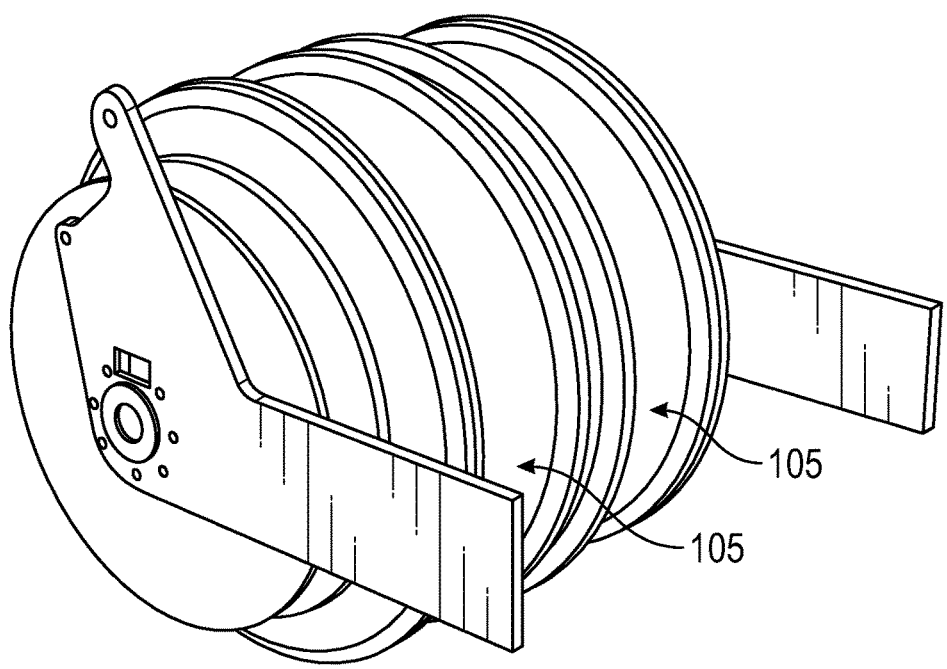
FIG. 33 is an image of the motor design according to one embodiment of the present invention.

FIG. 33 shows the motor for the disclosed vehicle.

Figure 34:
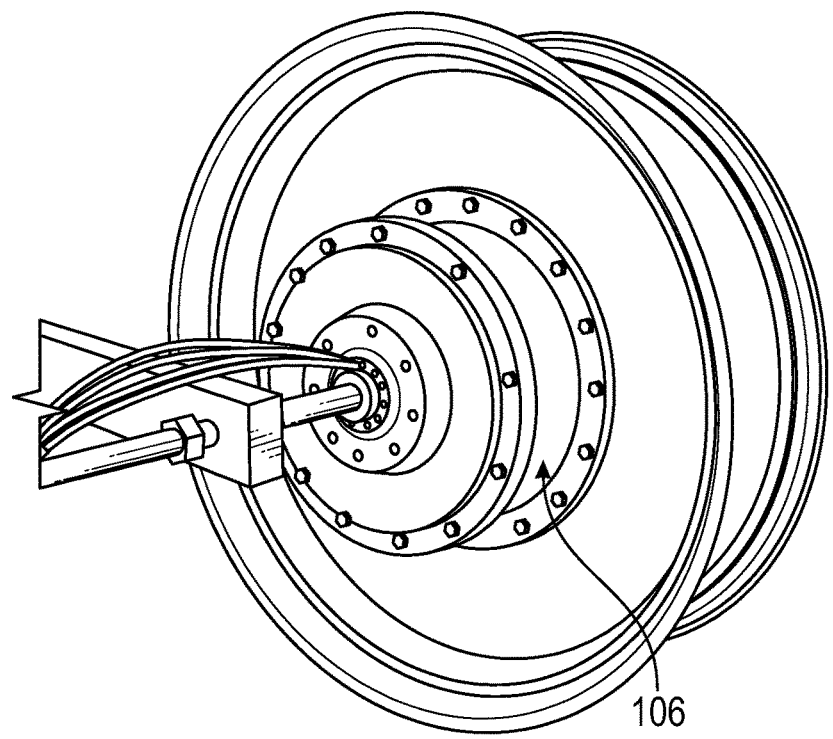
FIG. 34 shows the completed hub motor in the wheel according to one embodiment of the present invention.

FIG. 34 shows the completed motor for the disclosed vehicle.

Figure 35:
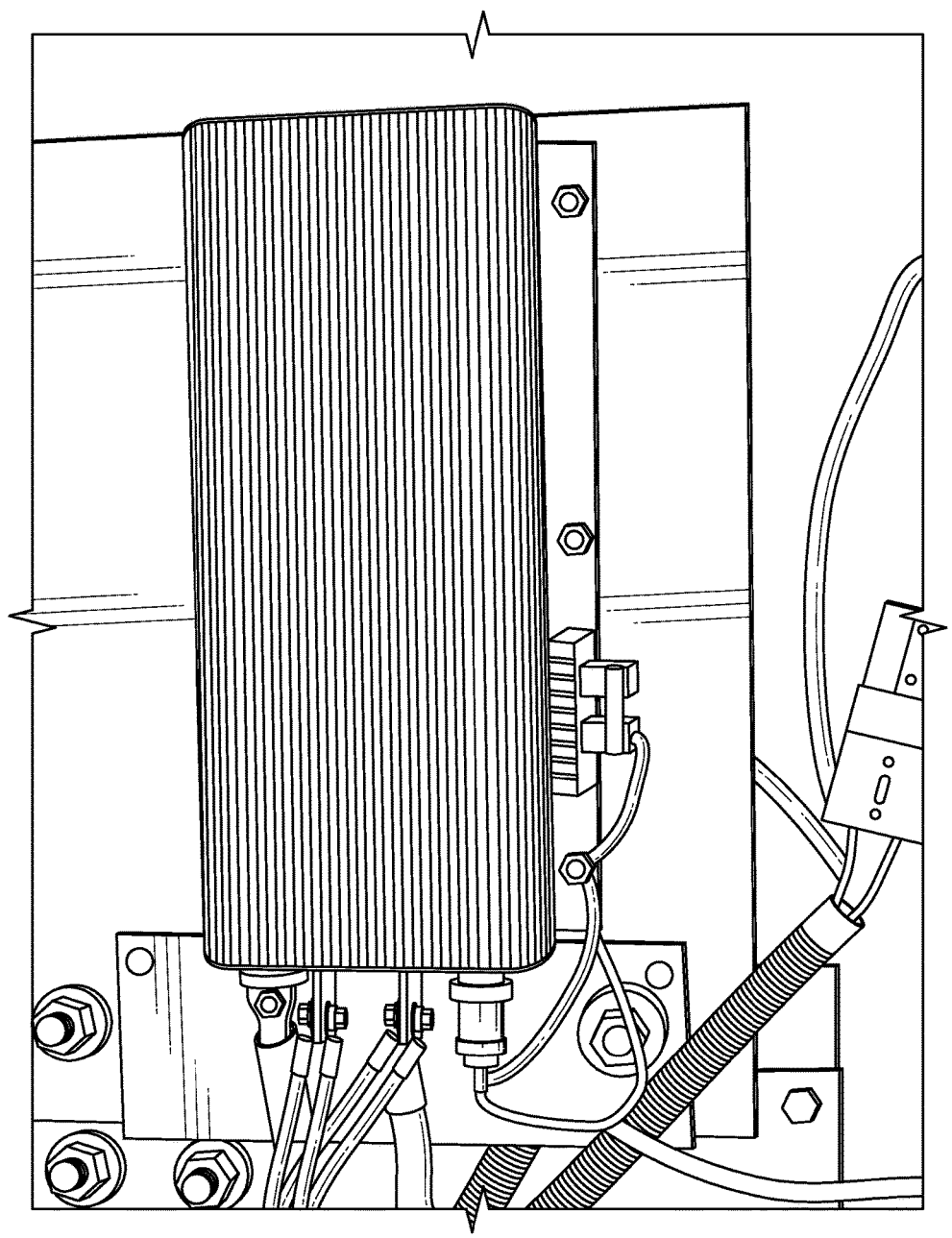
FIG. 35 shows the motor controller in place in the vehicle according to one embodiment of the present invention.

FIG. 35 shows the motor controller for the disclosed vehicle.

In one embodiment, the vehicle uses a 16.6 kHz, continuous 200A, peak 400A regenerative braking motor controller that manages the power flow of the battery, and motor. The motor controller monitors battery voltage. It will stop driving if battery voltage is too high. It will cut back, then stop driving if voltage is going too low. The motor controller provides regenerative braking through the motor, turning it into a generator to slow the vehicle and charge the battery. The regenerative braking feature is fully programmable and can be adjusted from little or no regenerative braking, which will allow the vehicle to coast, to maximum braking, which would slow the vehicle very quickly. The motor controller monitors motor temperature to prevent damage. The motor controller further cuts back current at low temperature and high temperature to protect battery and controller. The current will ramp down quickly if controller's temperature is higher than 90° C., and shut down at 100° C. Low temperature current ramping down usually starts at 0° C.

Figure 36:
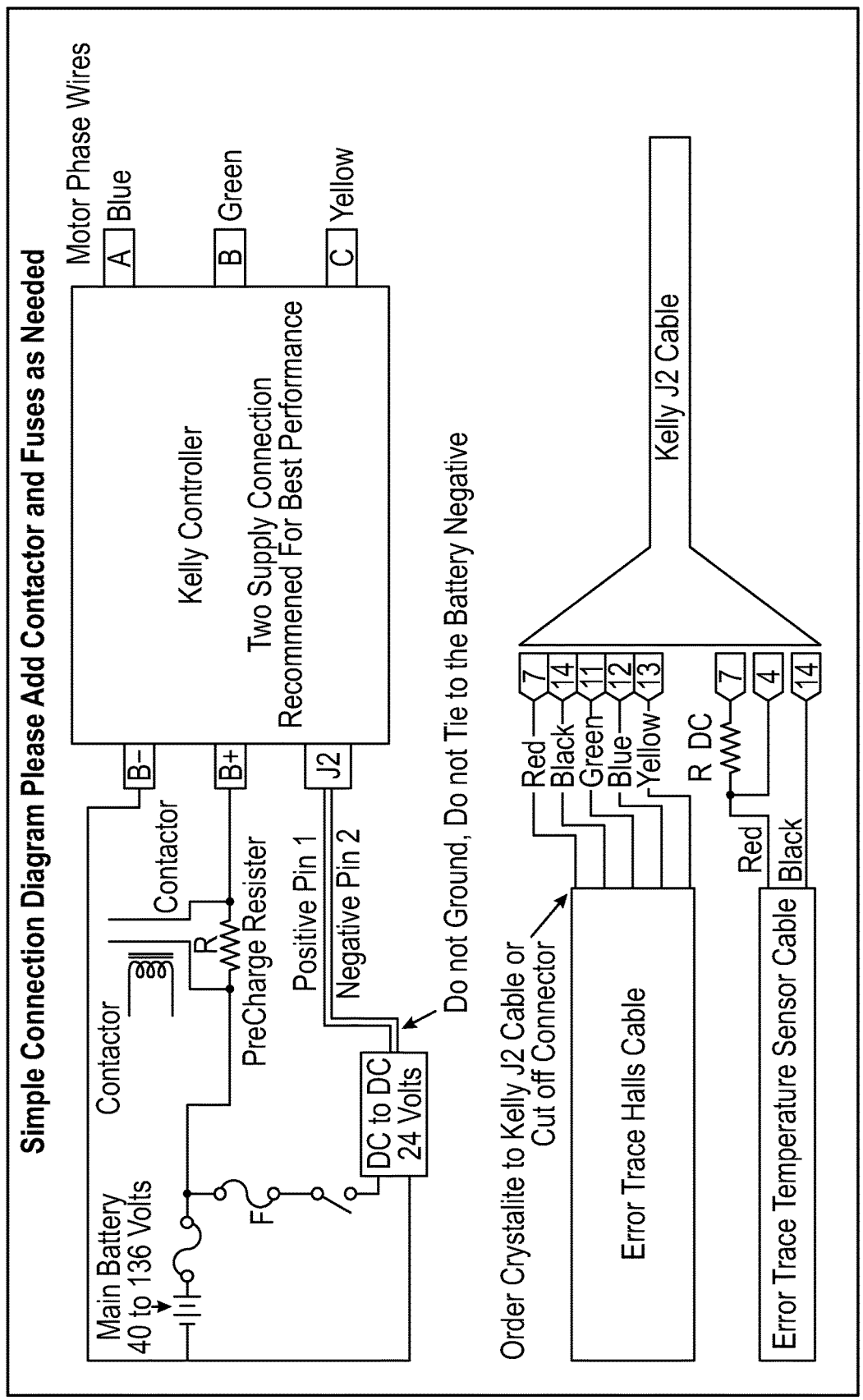
FIG. 36 shows a schematic for how the motor controller is attached into the vehicle according to one embodiment of the present invention.

FIG. 36 shows a schematic of how the motor controller is wired into the vehicle's electrical system. Alternatively, the vehicle could use other motors or motor controllers, with varying performance capabilities.

Figure 37:
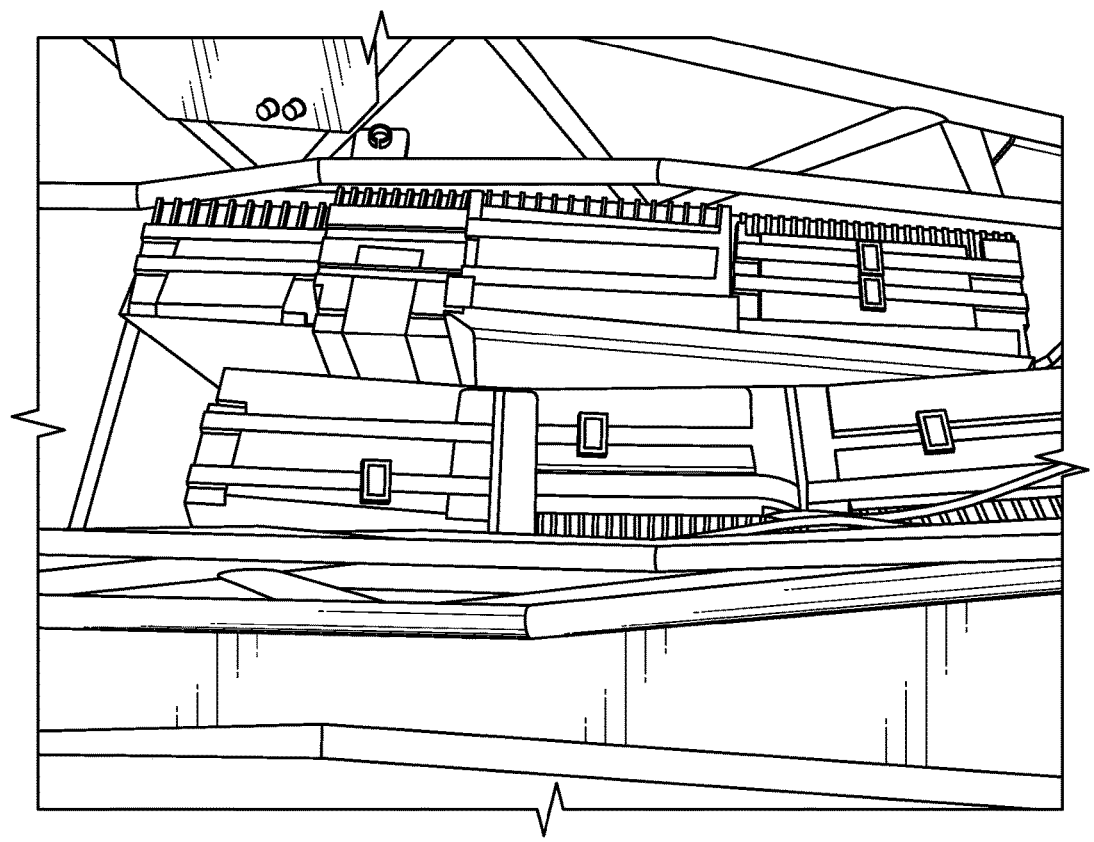
FIG. 37 shows the lithium ion battery pack installed in the vehicle battery box according to one embodiment of the present invention.

In a preferred embodiment, the vehicle uses a 4.6 kWh battery pack made up of 36, 3.2V, 40 Ah batteries in parallel, nominal voltage 120V. FIG. 37 shows the battery. The battery charge/discharge activity is handled by an energy management system (EMS) which is described in more detail below.

Figure 38:
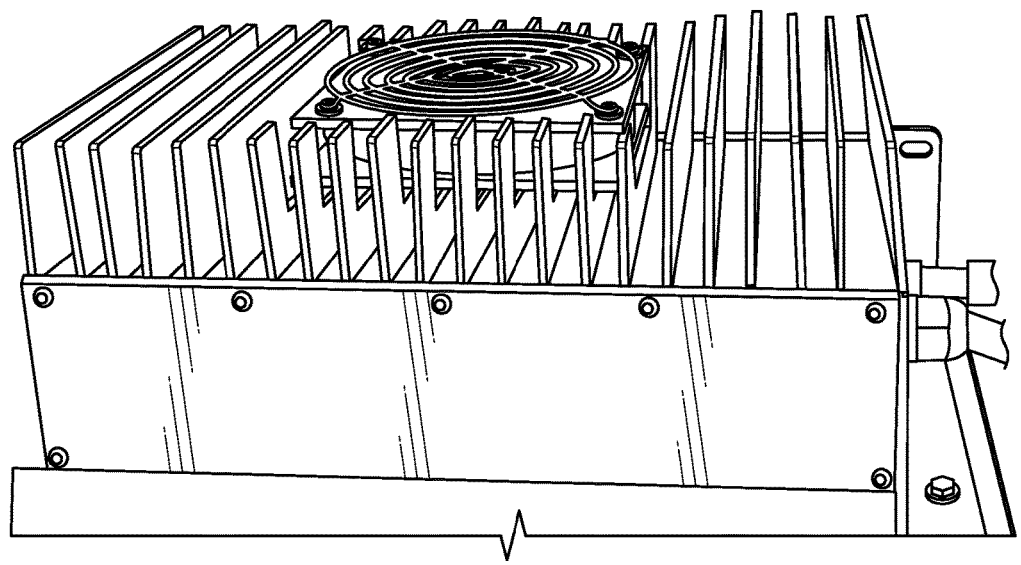
FIG. 38 shows the AC charger installed in the upper rear interior area of the vehicle according to one embodiment of the present invention.

There is an 115V AC battery charger that takes in power from a standard AC wall outlet. The AC battery charger may have an input voltage range that goes beyond 115V, for example, an AC input voltage range of 85V~265V. FIG. 38 shows the AC battery charger in place in the vehicle.

As an alternative, the vehicle could have an on-board gas or CNG (natural gas) generator to provide additional or alternative power to the drive-train.

Figure 39:
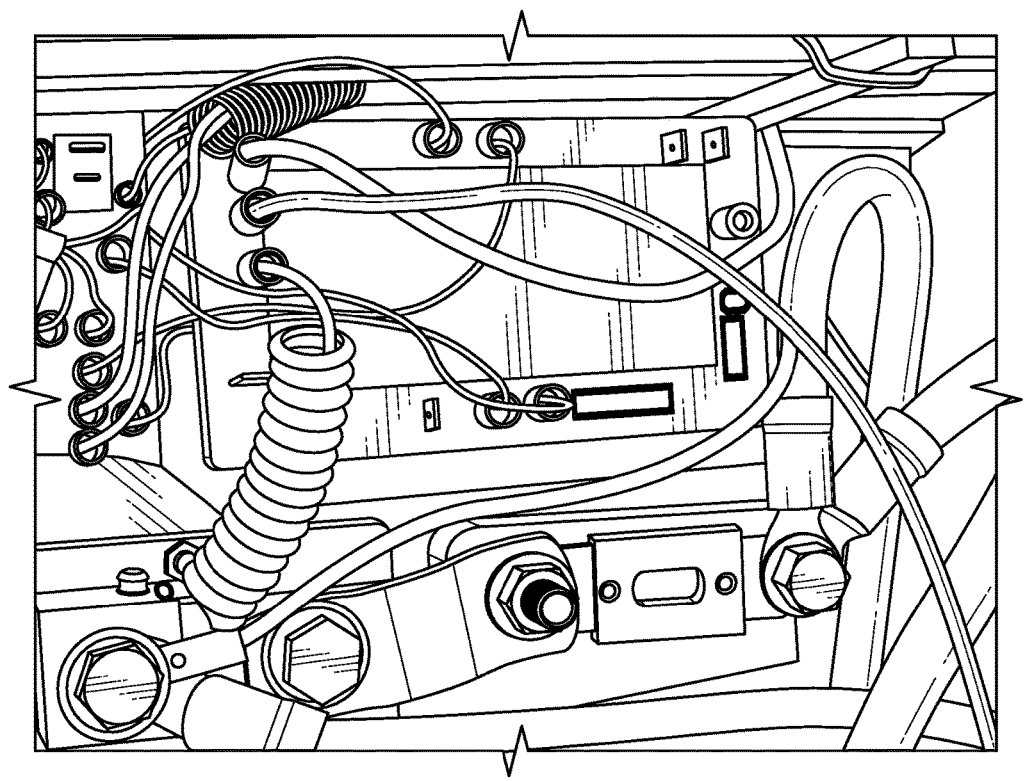
FIG. 39 shows the energy management system installed in the vehicle according to one embodiment of the present invention.

The EMS displays the condition of, and maintains the health of the batteries. It consists of two major components, the computer and the cell sense boards. The computer will tell information like the battery state-of-charge, battery current, battery voltage as well as the voltage and temperature of individual cells. FIG. 39 shows the EMS in place in the disclosed vehicle.

There are alarm outputs from the computer for cell over voltage and cell under voltage. In addition, there are warnings to let the driver know that error conditions are approaching. The EMS is designed so that the battery monitoring is completely isolated from the regular vehicle 12V system. The EMS is powered by an 8 core 32-bit microprocessor.

The vehicle as disclosed may include a variable resistance generating mechanism. As used herein, the term variable resistance generating mechanism can include, but is not limited to, any device that can create a force-varying load to resist work supplied by a user. For example, a variable resistance generating mechanism can include a pedal-driven electrical generator system where resistance can vary with the inclination of the vehicle 100.

The vehicle as disclosed may include a pedal-driven generator system with two essential parts that make it work, as described in detail below.

The pedal function of the vehicle is intended to mimic the operation of an electronic exercise bicycle. That is, the disclosed vehicle is programmable like an exercise bicycle. The overall goal of the electronically controlled variable resistance recharging system (or ECVRR) component is to allow the user to dynamically adjust the "feel" of resistance at the pedals based on an arbitrary workout profile, independent of varying load on the main battery. The increased physical resistance felt by a user as the program varies the pedaling intensity comes from the battery pack. A dimmer switch and servomotor-controlled gear shifter are placed between the battery and the pedal generator, and are controlled by a tablet computer built into the vehicle. When the exercise program's profile calls for steep hills, the electronic dimmer switch opens up, putting a greater battery recharge load on the generators, and the servo-controlled gear shifter adjusts the gear ratio to a higher gear, making it harder to pedal. When the program calls for flat stretches, the dimmer switch closes and the servo adjusts the gear ratio to a lower gear and permits less current to go to the battery.

Figure 40:
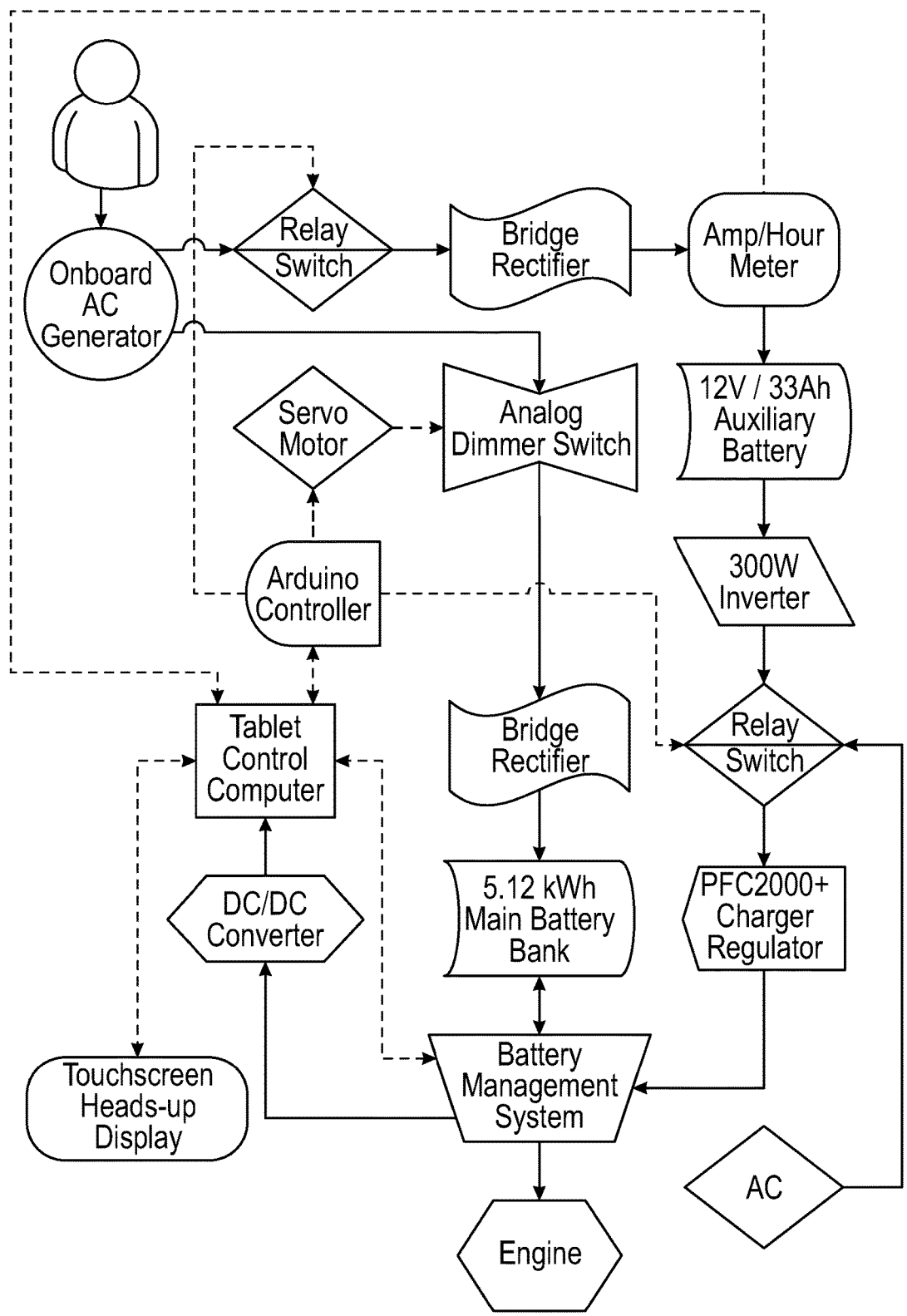
FIG. 40 is a diagram illustrating the design and function of the electronically controlled variable resistance recharging system and human power energy generation system.

One program mode would use GPS or other location-tracking software to use terrain data as the basis for adjusting pedal resistance higher and lower. The computer, in conjunction with the generator, mimics the incline and decline of the roadway and thus produces artificial hills to provide the rider a more realistic biking experience based on actual terrain. Any energy generated recharges the vehicle's battery bank. FIG. 40 illustrates the design/function of the ECVRR component.

Electric exercise bicycles employ resistance systems to simulate hills and are powered by an AC outlet, or by the machines themselves with a built-in generator. Any excess power generated by the rider is thrown away. The disclosed vehicle works in a similar fashion, but power (electrical current) produced by the rider is sent to recharge the battery, In some embodiments, the pedal system of the disclosed vehicle is not tied to a generator and does not generate any power for the vehicle; the pedal system is simply used as a means of exercise or to move the vehicle while pedaling, but excess energy created by pedaling is not stored for later use.

Figure 41:
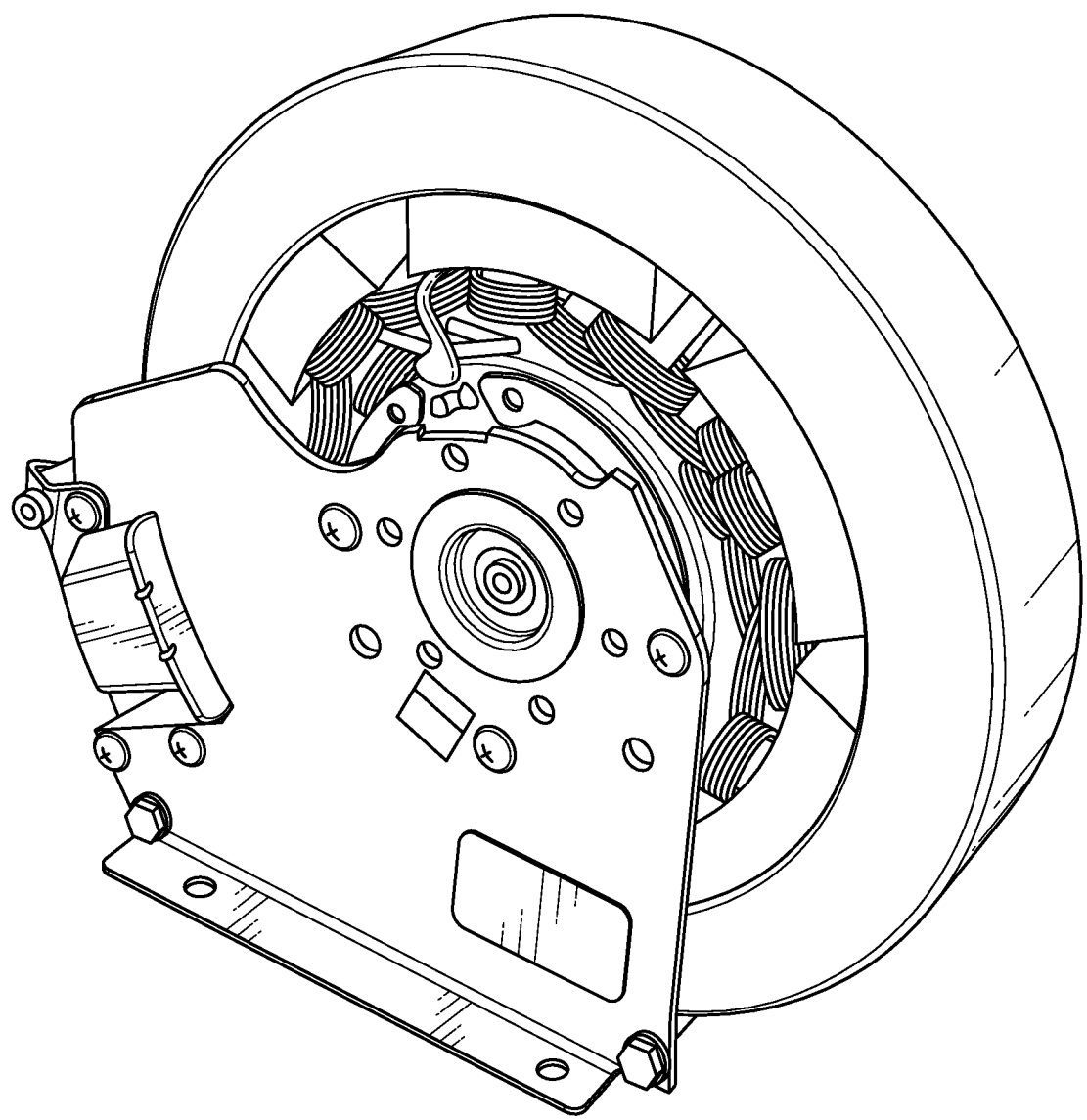
FIG. 41 shows the flywheel generator according to one embodiment of the present invention.
Figure 42:
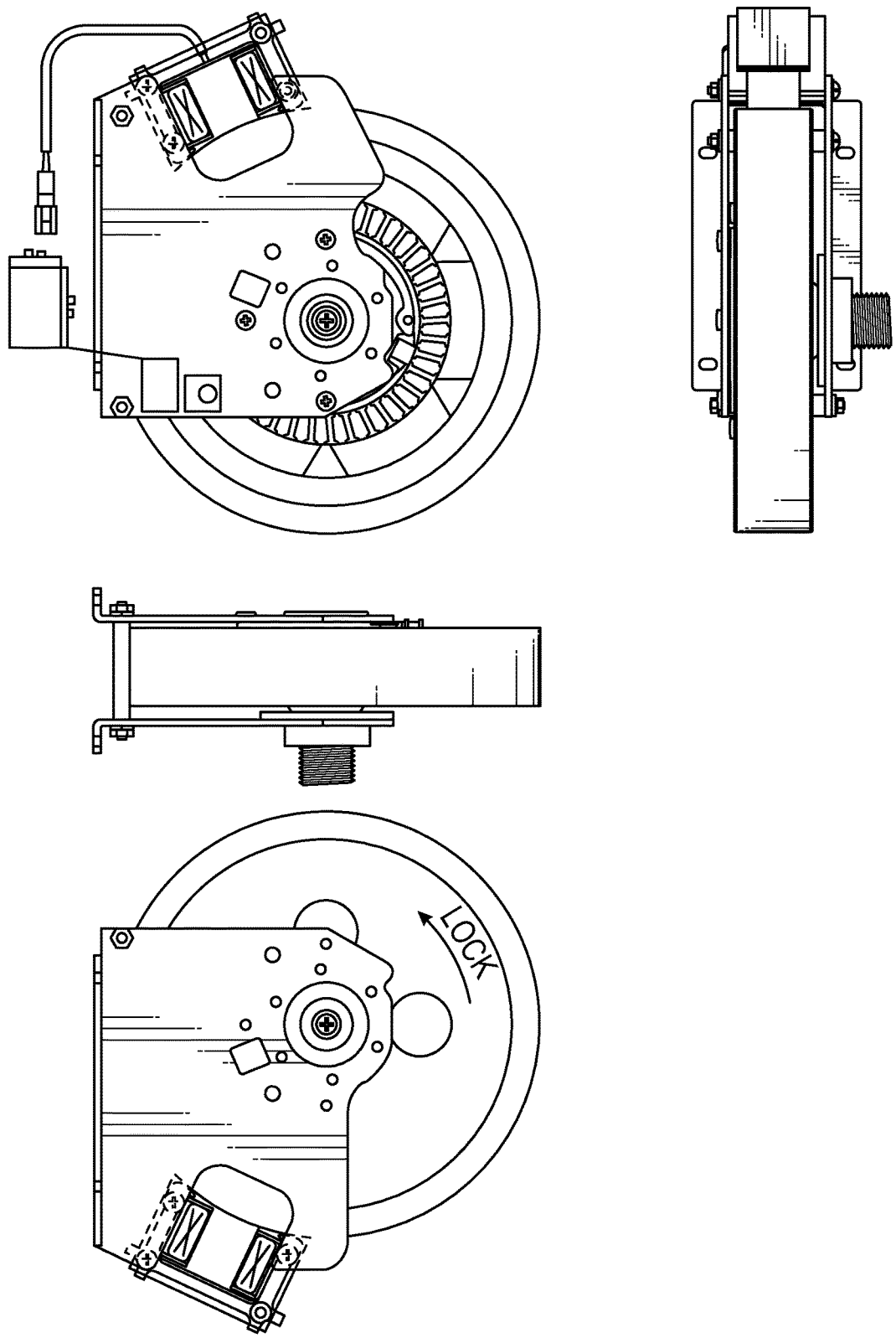
FIG. 42 is a schematic of one embodiment of the flywheel generator of the present invention.
Figure 45:
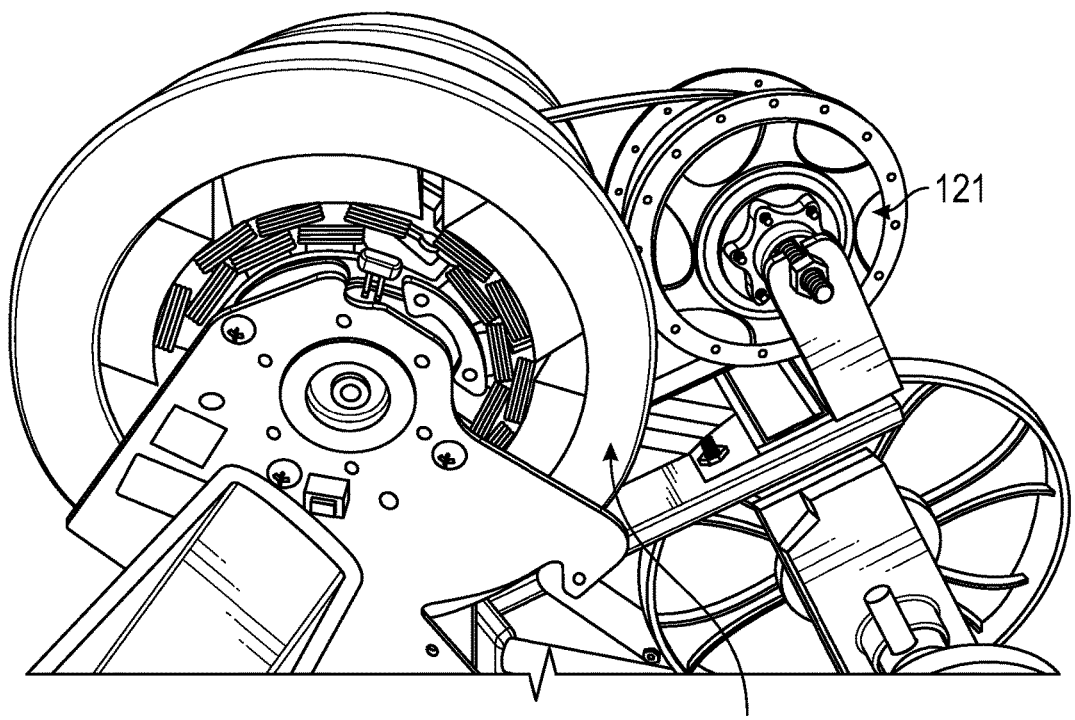
FIG. 45 shows the infinitely variable in-hub bicycle transmission connected to the generator and pedal mount according to one embodiment of the present invention.
Figure 46:
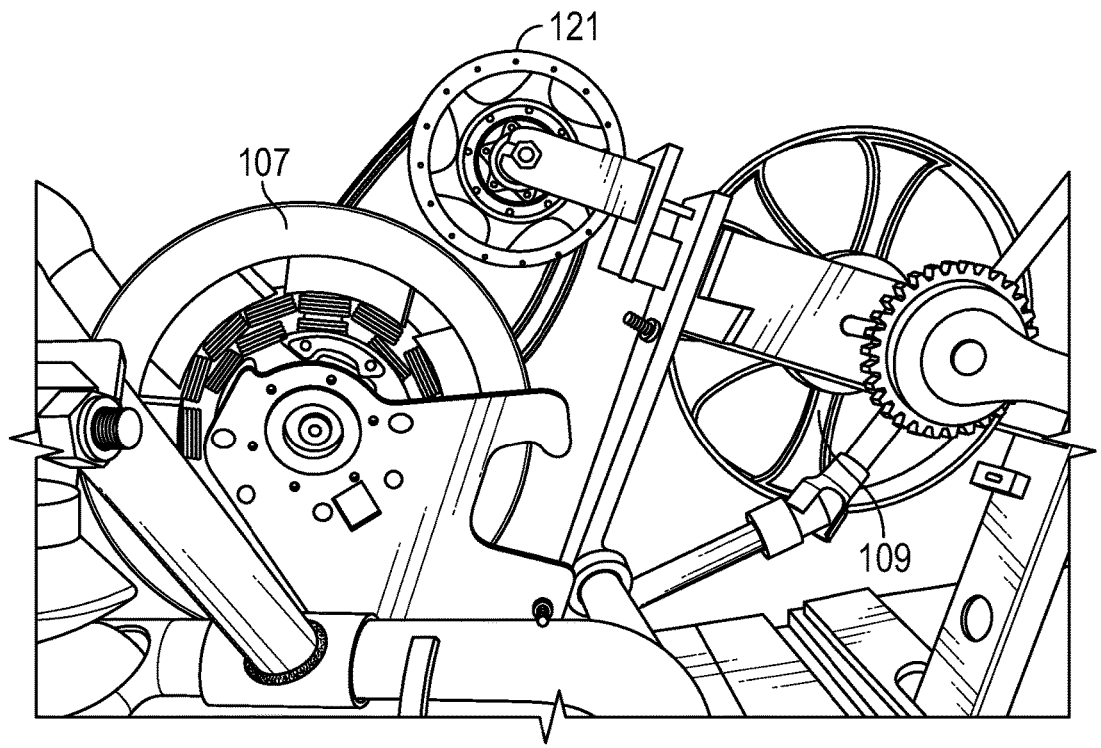
FIG. 46 shows another view of the pedal generator with infinitely variable in-hub bicycle transmission, flywheel generator, pulley and pedal cranks, according to one embodiment of the present invention.
Figure 47:
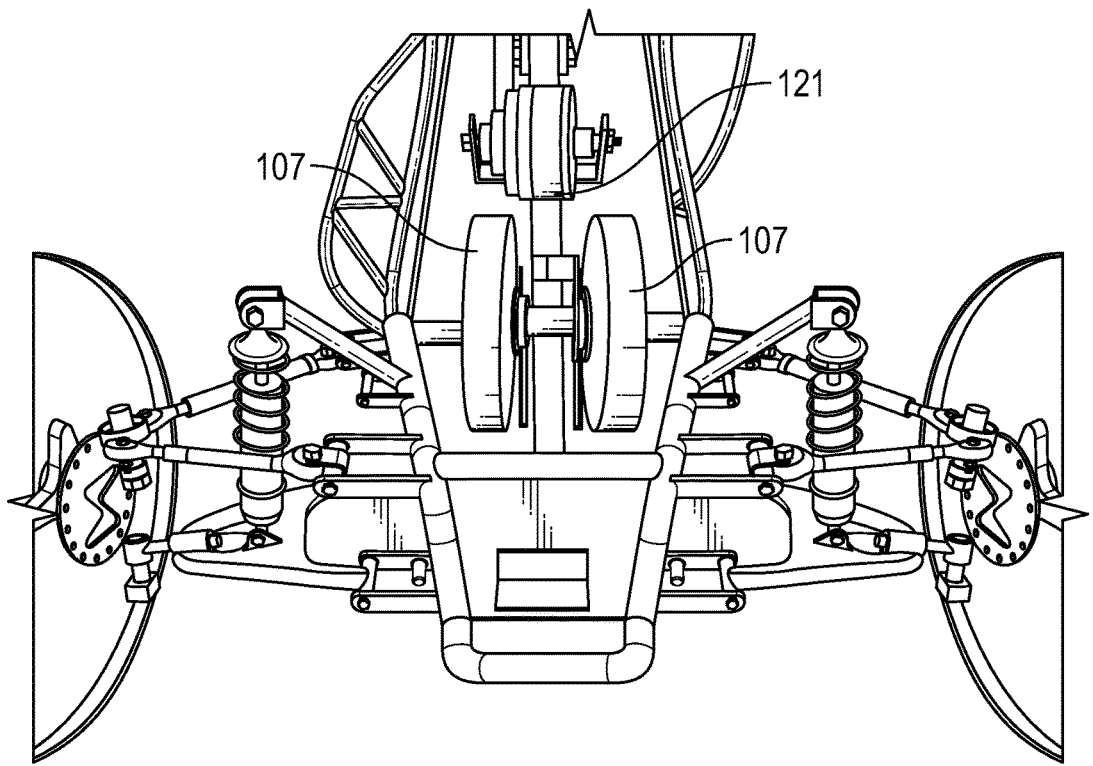
FIG. 47 is a top view of the infinitely variable in-hub bicycle transmission and flywheel generators in the chassis of the vehicle, according to one embodiment of the present invention.
Figure 48:
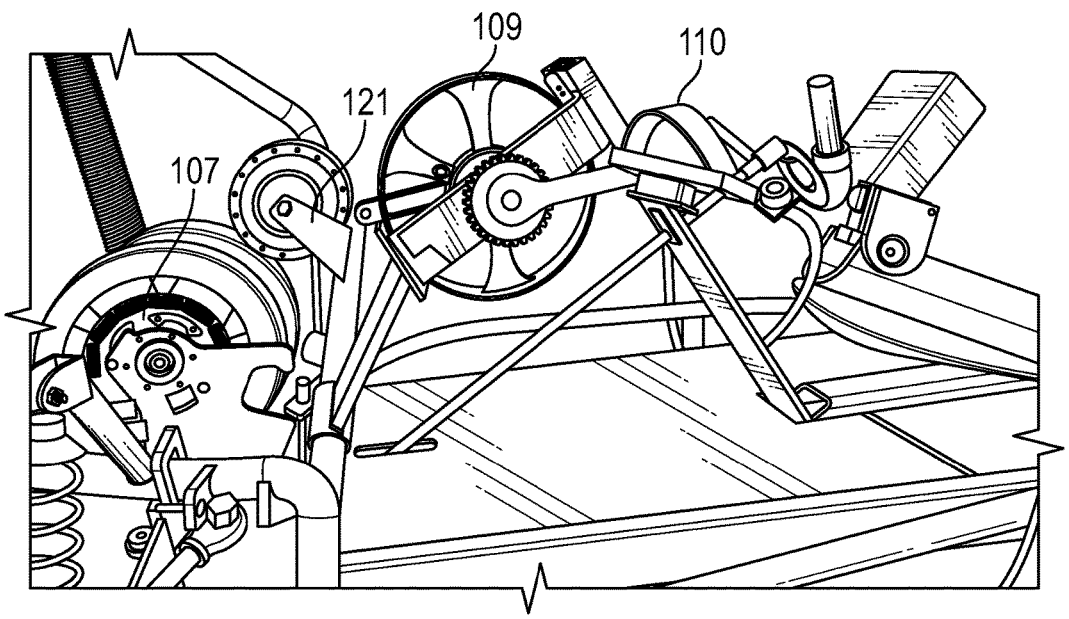
FIG. 48 is a view of the pedal generator with infinitely variable in-hub bicycle transmission, flywheel generator, pulley and pedal cranks, according to one embodiment of the present invention.
Figure 49:
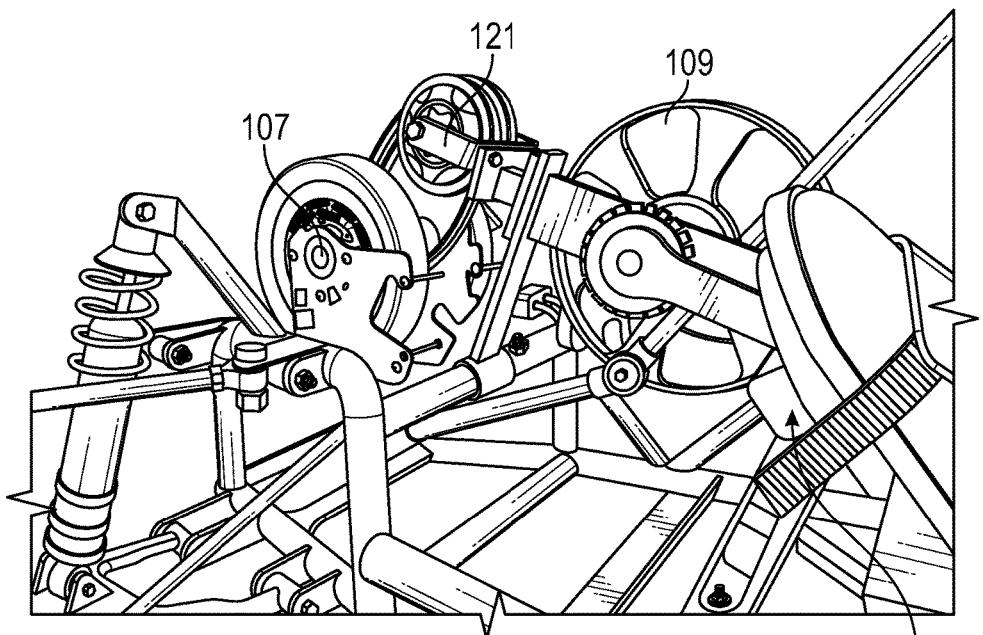
FIG. 49 is a view of the pedal generator with the infinitely variable in-hub bicycle transmission, flywheel generator, pulley and pedal cranks according to one embodiment of the present invention.
Figure 50:
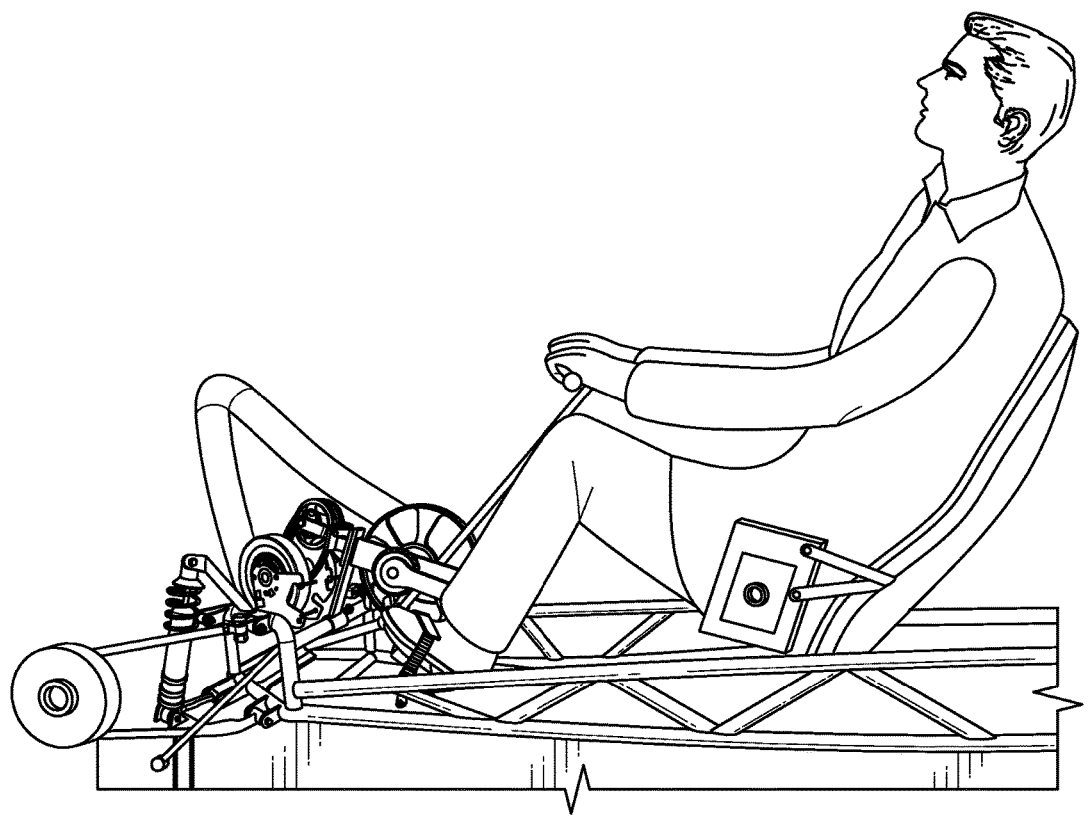
FIG. 50 shows rider positioning within the chassis and how the generator would be pedaled according to one embodiment of the present invention.
Figure 51:
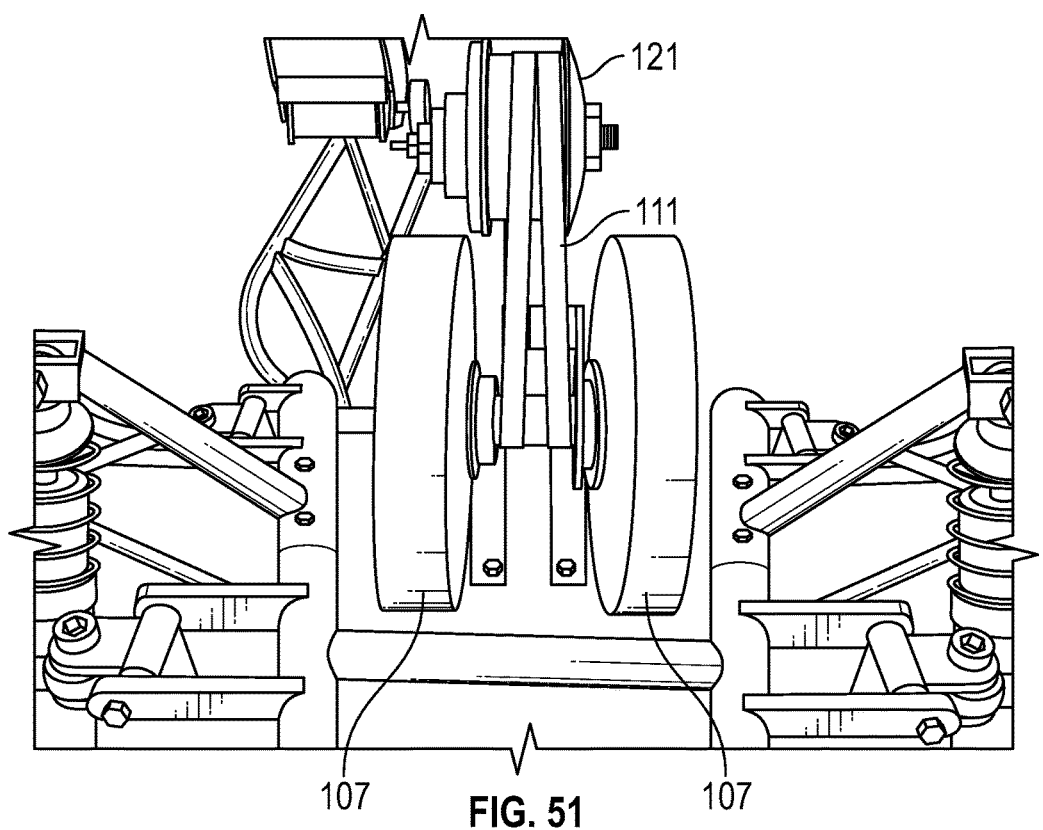
FIG. 51 shows a top view of the pedal generator system with drive belts in place according to one embodiment of the present invention.
Figure 52:
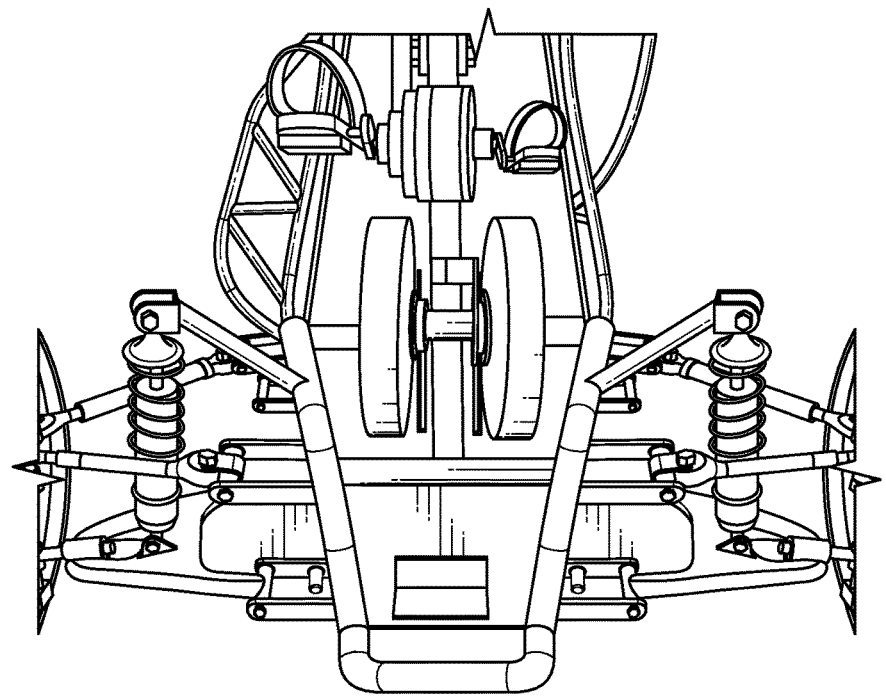
FIG. 52 shows a top view of the infinitely variable in-hub bicycle transmission and flywheel generators in place inside the chassis with drive belts in place, according to one embodiment of the present invention.

In one embodiment, the vehicle may be programmable like an exercise bicycle and ideally will behave like an exercise bicycle. As a user pedals, the user's work output is fed into two flywheel generators 107 (see FIG. 45). FIGS. 41 and 42 illustrate the flywheel generator 107 used. Both generators are identical and connected by belt to an infinitely variable in-hub bicycle transmission 121, such as the NUVINCI technology from Fallbrook Technologies, Inc. of San Diego, Calif., which in turn is connected by belt to a pulley with the pedals & cranks attached. In some embodiments, the flywheel generator 107 may have the following specifications:

1. Torque: 68±10% Kgf-cm at 1.6A, 600 rpm (Air Gap 0.6 mm±0.2). (1 Kgf=9.8 Newtons)

2. No load torque: Under 3 Kgf-cm at 600 rpm (Brake only)

3. DC resistance of 3 phase AC generator: (for U.V or U.W or V.W.): 26.8Ω±10% (V.V.W.)/27° C.

4. DC Resistance of field coil: 12.1Ω±10%/27° C.

5. Insulation: DC 500V, 10 MΩ (Min) coil to core

6. Balance under (Flywheel): 1000 rpm/0.24 m-g

7. Hi-Pot Test: 1200 VAC/10 mA/1 min

8. Winding Magnet Wire: EIW φ0.55 (180° C.)

Both generators are connected to the battery and both are controlled by a computing device. The computing device is connected to a microcontroller, such as an Arduino circuit board that can receive input from a computing device and then control a servomotor and gear shifter.

In one embodiment of the vehicle, there are two ways the computer controls pedal resistance. One output from the microcontroller goes to a DC voltage controlled electronic dimmer switch; another output goes to a servomotor connected to the gear shifter.

The microcontroller output going to the dimmer switch is wired in between the flywheel generators 107 and battery 120. A computer program activates the microcontroller, which then in turn activates the dimmer switch to open and close the dimmer. When open, more current is allowed to flow through; when closed, current flow is prevented. The varying pedal resistance the user feels as he/she pedals the vehicle is a result of varying levels of charge current going to the battery. The more open the dimmer switch is, the harder it is to pedal; the more closed, the easier it is to pedal. The exercise program on the computing device controls the electronic dimmer switch. When the exercise profile calls for steep hills, the electronic dimmer switch opens up all the way, allowing the most current to pass through, thus putting a greater load on the generators and making it harder to pedal. When the program calls for flat stretches, the dimmer switch closes and permits less current to go to the battery.

The microcontroller output going to the servomotor physically moves the controller of a gear adjustment dial of the infinitely variable in-hub bicycle transmission internal hub gear. When the computing device calls for more resistance, the servo shifts the gear-adjusting dial to a higher (more difficult) gear and when the computing device calls for less resistance, the servo shifts the gear dial to a lower (easier) gear.

The electronic dimmer switch system and the servo gear shifting systems work in concert to provide the most efficient and variable pedal resistance charging possible.

Conventional bike-powered generators rely on a large bike tire (26" and bigger) to turn the much smaller crank on the generator. This reduction causes the generator to spin fast—the bigger the bike wheel, the faster the generator and the higher the power output. Ideally, you would have a 35" or larger wheel spinning the generator, but that is not practical for a small vehicle like that disclosed herein.

Figure 43:
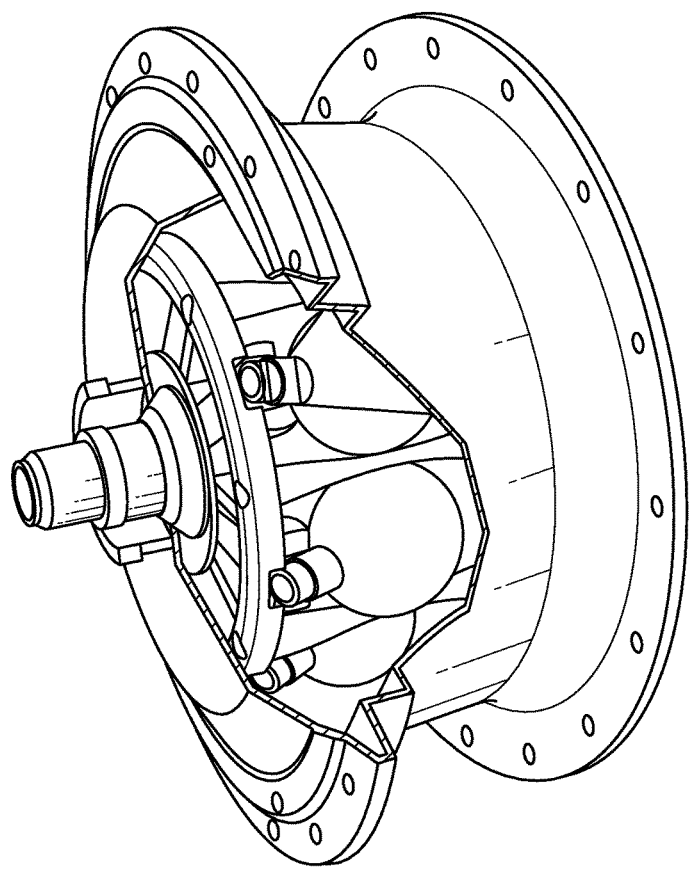
FIG. 43 is a cutaway image of one embodiment of the infinitely variable in-hub bicycle transmission of the present invention.
Figure 44:
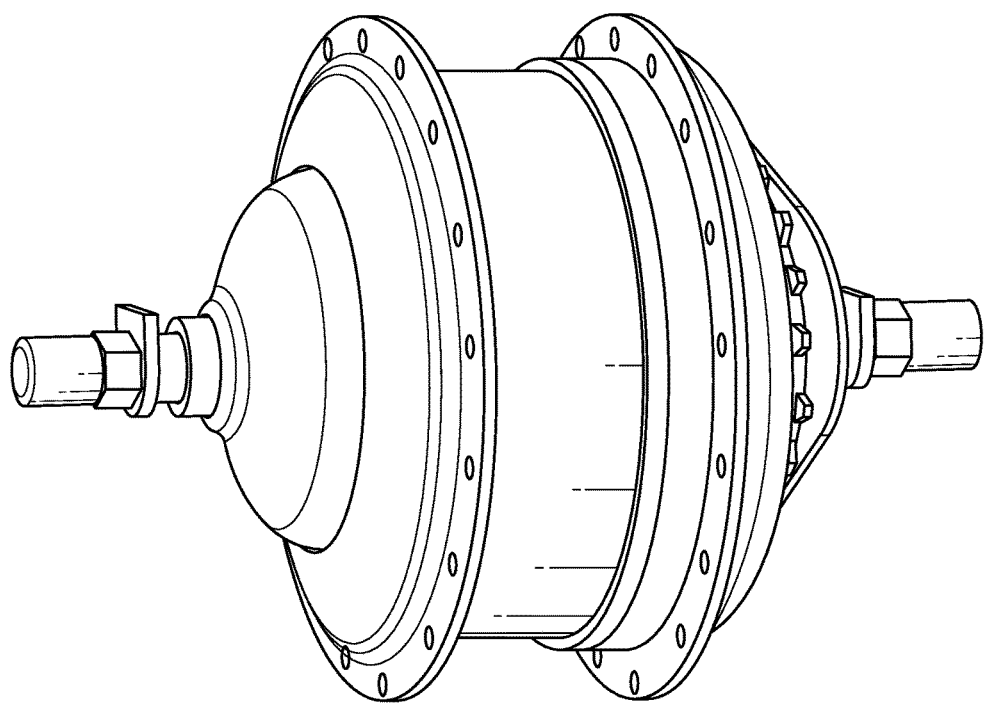
FIG. 44 is an external view of one embodiment of the infinitely variable in-hub bicycle transmission of the present invention.

The solution is a double reduction gearing that will spin the generator faster than a 35" wheel, but in a smaller, more compact space. The use of an infinitely variable in-hub bicycle transmission 121 (see FIGS. 43 and 44) saves more space. Instead of having to have two large pulleys for the double reduction, one smaller pulley and the in-hub gear system will accomplish the same task.

Pedals are directly connected to an 11" pulley that is connected by a belt to the in-hub gear system. The in-hub gear system is in turn connected directly to the two AC generators with clutches. The in-hub gear system is an infinitely variable, totally enclosed rear wheel bicycle hub gear. It is intended for use with bicycles, but works in the disclosed vehicle because even though it is a high-speed electric vehicle, the pedal cadences are still those of a typical bicycle. FIGS. 45 through 52 illustrate the double reduction, dual generator pedal system.

As illustrated in FIGS. 45 through 52, the infinitely variable in-hub bicycle transmission 121 is attached to the flywheel generators 107 by belts 111. A pulley 109 is attached to the pedal cranks 110.

The generators are wired in parallel. Two generators won't necessarily make twice as much power, but two generators in parallel will provide the amps the disclosed vehicle needs at lower generator RPM's.

The human power energy generation system can be switched to outboard mode. In this mode, appliances, batteries, or other items requiring a power source can be plugged into the vehicle. In this mode, the vehicle becomes a portable human generator. This feature makes the vehicle a form of transportation and a transportable source of electric power. The vehicle could, for instance, be used for emergencies or in locations without access to a conventional electrical grid.

The electronically controlled variable resistance recharging system (or ECVRR system) and the double reduction, dual generator systems enable the vehicle and rider to vary the resistance, send all the power that the person generates to the batteries without throwing any of it away and generate enough power so that the rider contributes to the battery as much as physically possible. The disclosed vehicle is designed to achieve highly efficient electrical power production.

Figure 53:
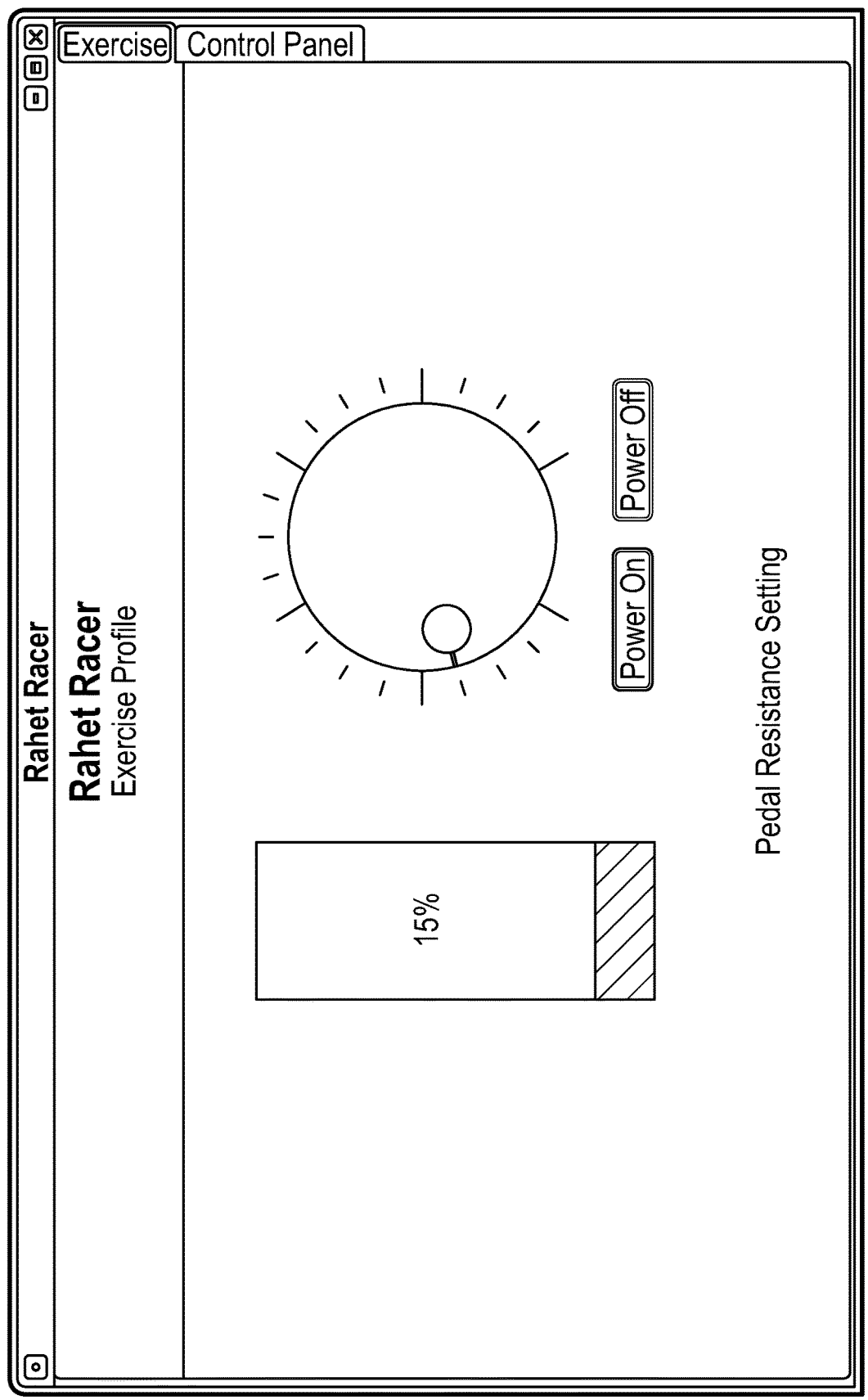
FIG. 53 is an example user interface according to one embodiment of the present invention.
Figure 54:
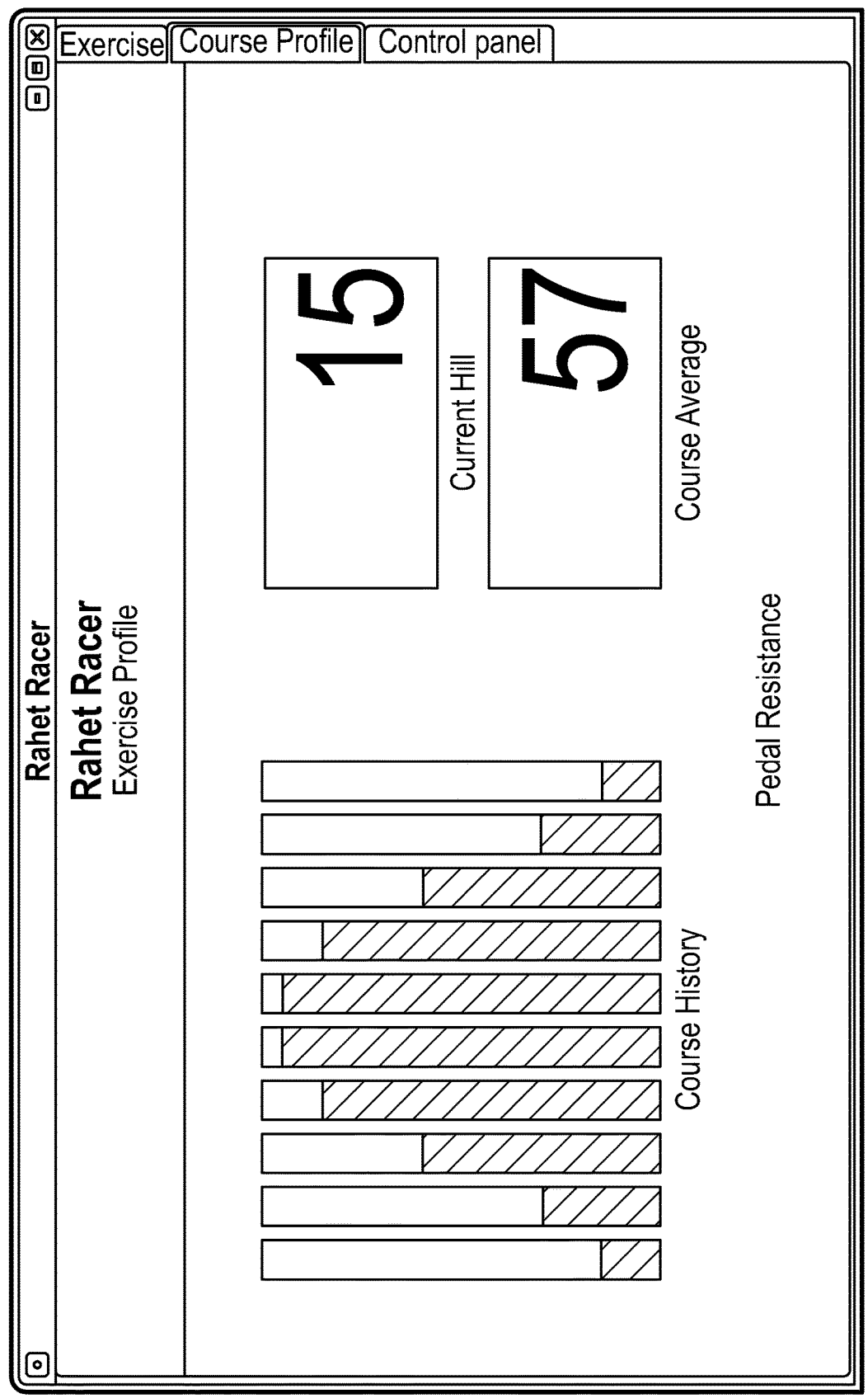
FIG. 54 is an example user interface according to one embodiment of the present invention.

In some embodiments, the vehicle includes a computing device 302, for example, a touchpad or tablet computer. The vehicle may use a simple touchpad screen situated in front of the driver to control vehicle functions. Typical electric vehicle information such as speed, odometer, percentage of charge remaining, battery drain rate, amps, charging stations, lighting controls, ventilation controls and alarm could be displayed on one screen of the tablet. The driver can switch screens to access the exercise program functions. FIGS. 53 and 54 show examples of screen graphics that might be displayed on the vehicle's touchpad screen.

Figure 57:
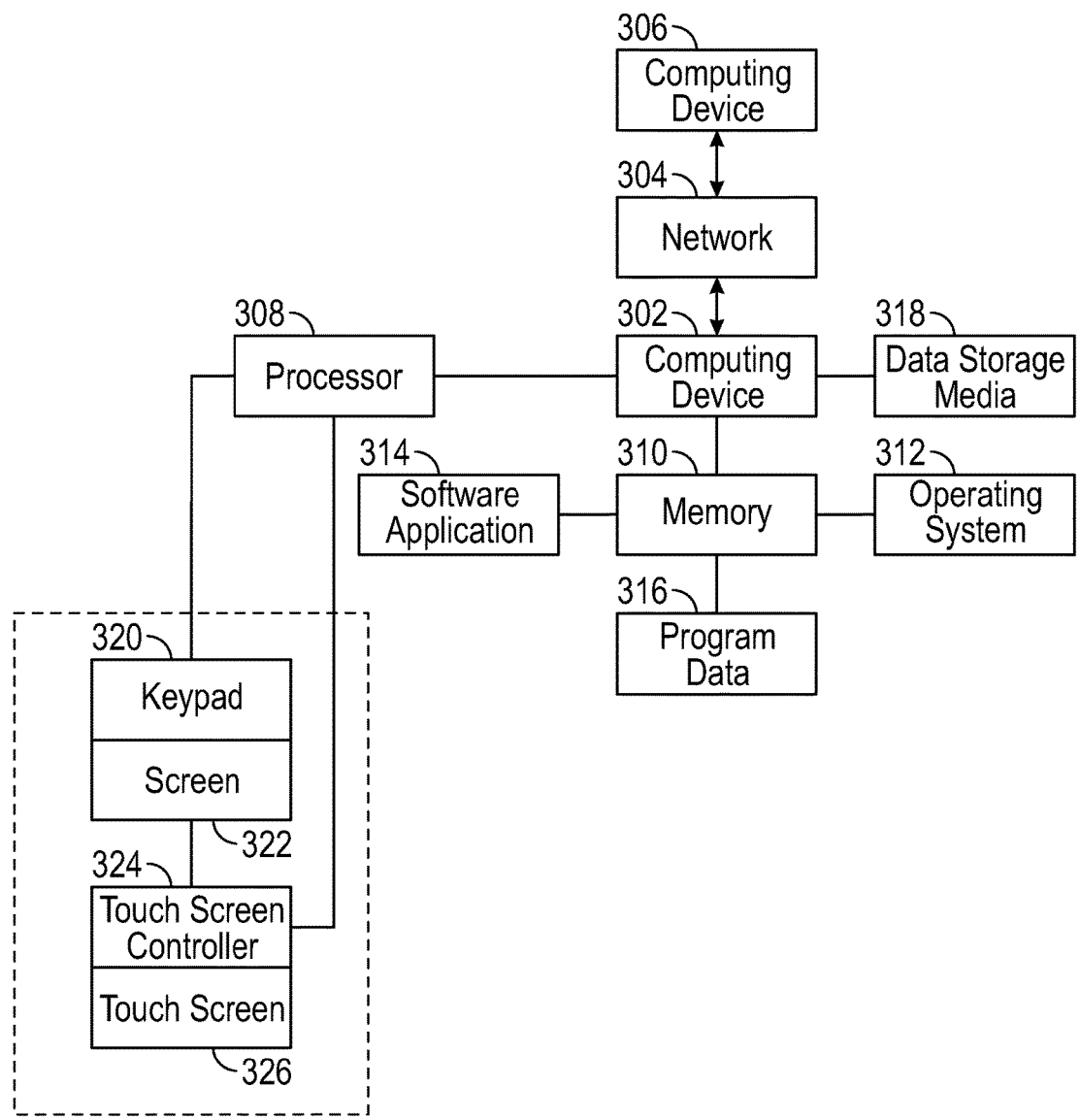
FIG. 57 is a schematic block diagram of an example computing system.

FIG. 57 is a schematic block diagram of an example computing device 302 that may be used in some embodiments of the vehicle. Computing device 302 can be, for example, a smart phone or other mobile device, a tablet computing device, a netbook, and a computing device built in to the vehicle or any other portable or mobile computing device. Computing device 302 can be a stand-alone computing device 302 or a networked computing device that communicates with one or more other computing devices 306 across network 304. Computing device 306 can be, for example, located remote from computing device 302, but configured for data communication with computing device 302 across network 304. Computing device 306 can be, for example, a server.

In some examples, the computing device 302 includes at least one processor or processing unit 308 and system memory 310. Depending on the exact configuration and type of computing device, the system memory 310 may be volatile (such as RAM), non-volatile (such as ROM, flash memory, etc.) or some combination of the two. System memory 310 typically includes an operating system 312 suitable for controlling the operation of the computing device, such as the WINDOWS® operating systems from Microsoft Corporation of Redmond, Wash. or a server, such as Windows SharePoint Server, also from Microsoft Corporation. To provide further example, if the computing device 302 is a smart phone, tablet or other mobile device, the operating system 312 may be Android, iOS, or any other available mobile operating system. The system memory 310 may also include one or more software application(s) 314 and may include program data 316. The one or more software applications 314 may be in the form of mobile applications in examples wherein the computing device is a mobile device.

The computing device may have additional features or functionality. For example, the device may also include additional data storage devices 318 (removable and/or non-removable) such as, for example, magnetic disks, optical disks, or tape. Computer storage media 318 may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. An example of computer storage media is non-transitory media.

In some examples, the computing device 302 can be a tablet computer or other mobile device positioned in front of the driver in the vehicle described herein. The computing device 302 may have input device options including, but not limited to, a keypad 320, a screen 322, a touch screen controller 324, and/or a touch screen 326. In some embodiments, electric vehicle information and exercise program functions are stored as data instructions for a software application 314 on the computing device 302. A network 304 may facilitate communication between the computing device 302 and one or more servers, such as computing device 306, to facilitate the electric vehicle operations, displays and functions associated with the computing device 302, as described herein. The network 304 may be a wide variety of different types of electronic communication networks. For example, the network may be a wide-area network, such as the Internet, a local-area network, a metropolitan-area network, a cellular network or another type of electronic communication network. The network may include wired and/or wireless data links. A variety of communications protocols may be used in the network 304 including, but not limited to, Ethernet, Transport Control Protocol (TCP), Internet Protocol (IP), Hypertext Transfer Protocol (HTTP), SOAP, remote procedure call protocols, and/or other types of communications protocols.

In some examples, computing device 306 is a Web server. In this example, computing device 302 includes a Web browser that communicates with the Web server to request and retrieve data. The data is then displayed to the user, such as by using a Web browser software application. In some embodiments, the various operations, methods, and rules disclosed herein are implemented by instructions stored in memory. When the instructions are executed by the processor of one or more of computing devices 302 and 306, the instructions cause the processor to perform one or more of the operations or methods disclosed herein.

Examples of operations include displaying vehicle information, exercise program functions, and providing location information/directions using GPS-enabled software applications.

The computing device 302 may include image capture devices, whether a dedicated video or image capture device, smart phone or other device that is capable of capturing images and video. Further, the computing device 302 may be a tablet computer or smart phone with native or web-based applications that can capture, store and transmit time-stamped video and images to a central server. The computing device 302 can also include location data captured by a GPS-enabled application or device. The computing device 302 may also have WiFi or 3G capabilities.

Figure 55:
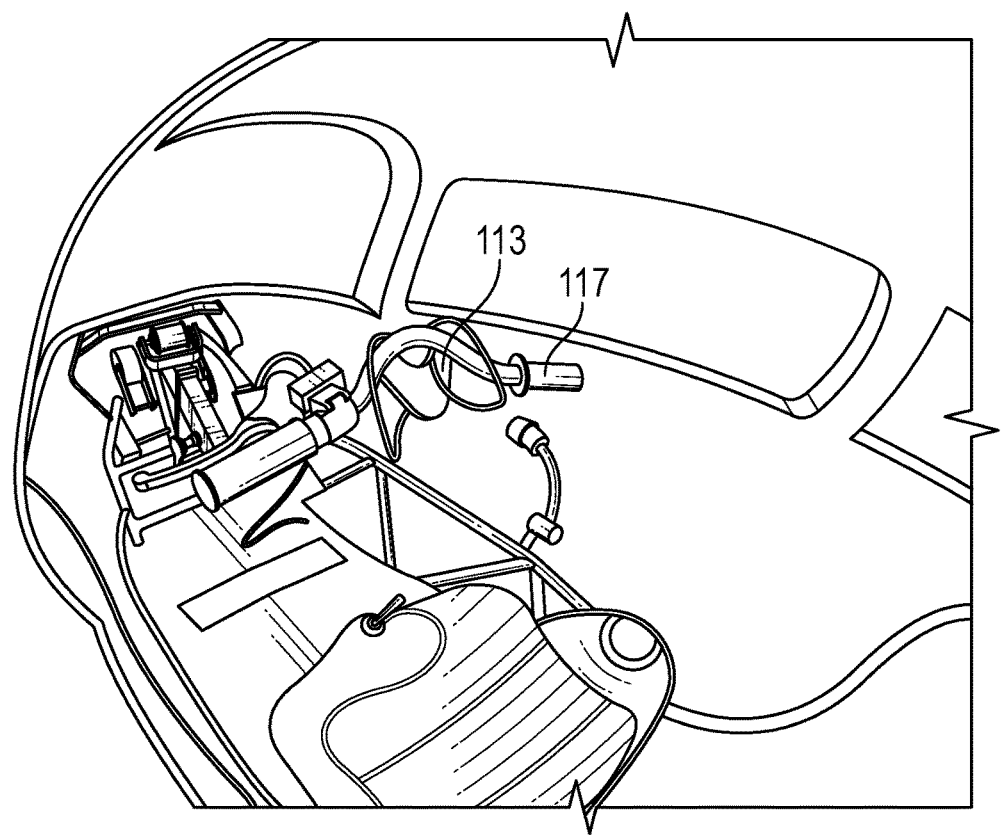
FIG. 55 shows the steering controls of the vehicle according to one embodiment of the present invention, wherein front and rear brakes are hydraulic and actuated by levers on the left and right side of the handlebars.
Figure 56:
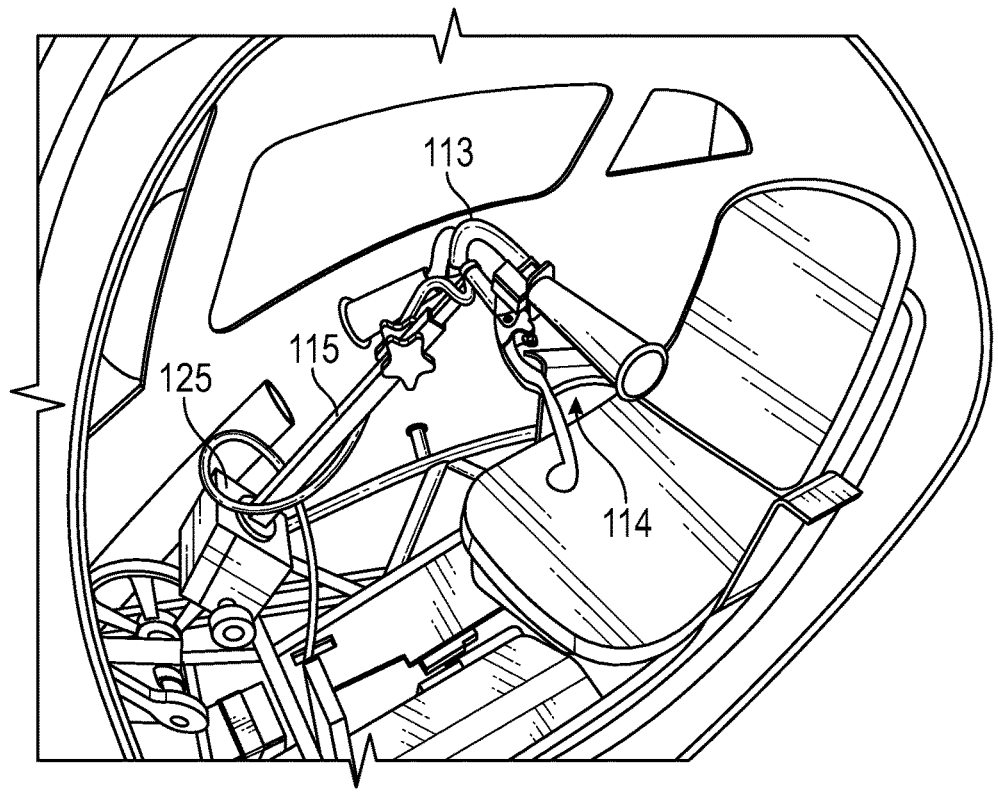
FIG. 56 shows a view of the steering wheel and controls according to one embodiment of the present invention.

In one embodiment, steering can be accomplished by a number of different means, including a standard steering wheel sized to fit the internal dimensions of the vehicle, handlebars, plane-style yolk, or other means. In addition, the vehicle can be outfitted with brake and accelerator pedals in a floor mount position or by the steering control (as on a motorcycle). FIGS. 55 and 56 illustrate the steering wheel controls, including a steering wheel 113, front brakes lever 114, steering column 115, steering column pivot adjust 125 and a throttle 117. Turn signals and lights may also be utilized. Such lights could be mounted to the body or made integral to the body (built in) to reduce aerodynamic drag.

Among other things, the present disclosure provides a serial hybrid electric bicycle that can provide variable resistance to pedaling. As used herein, the term serial hybrid electric bicycle can include, but is not limited to, a vehicle driven by an electric motor that is supplemented or controlled by user-supplied pedal input. The variable resistance can provide for different simulated experiences. Variable resistance can be used to emulate a direct response of the vehicle to a pedaling input, optionally with torque amplification.

Figure 58:
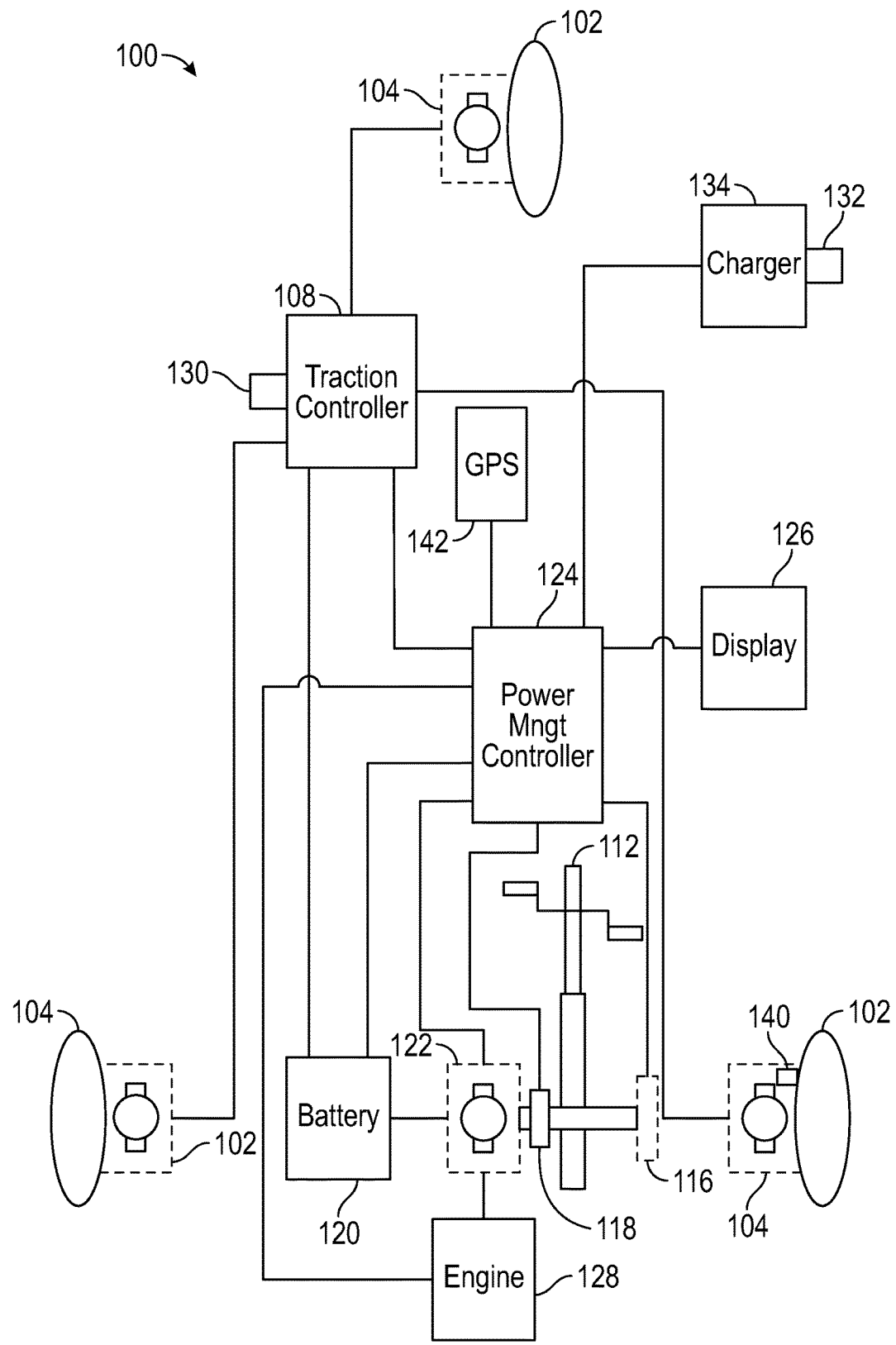
FIG. 58 is a schematic of a variable resistance serial hybrid electric bicycle according to an example.

FIG. 58 is a schematic of a variable resistance serial hybrid electric bicycle, according to an example. The vehicle 100 includes one or more wheels 104. These can be arranged in a tricycle format via a chassis, such as with a single rear, as illustrated, but the present subject matter is not so limited. One or more of the wheels 104 can be coupled, either directly, or via some torque amplifier, such as a transmission, to a motor 102. A motor 102 can generate energy, as in the case of regenerative braking.

A traction controller 108 can be coupled to one or more motors 102. The traction controller can include one or more switches to control electric power transmission with the motor 102. IGBT transistors can be used in the traction controller. The traction controller 108 can include a regenerative braking circuit 130 configured to apply a braking torque to the drive wheel 104 and/or to charge the battery 120. The traction controller can control drive torque, such as that produced by the motor 102, to provide a desired slip at the drive wheel 104. A wheel speed sensor 140 can be used to monitor slip. The traction controller 108 can control stability of the chassis with respect to a road surface travelled by the chassis.

In electrical communication with the traction controller 108 is a power management controller 124. The power management controller can control a number of functions of the vehicle 100. For example, a display 126, such as a touch screen, can be used to select between operations drive modes, or otherwise control driving aspects of the vehicle 100, via interface with and control of the power management controller.

A power source can supply power to operate the vehicle 100. In an example, a power source can include, but is not limited to, a battery 120, a generator 122 or a pedal drivetrain 112. A battery 120 can be coupled to the power management controller 124. A generator 122 can be coupled to the power management controller 124. A pedal drivetrain 112 (e.g., including pedals 114) can be coupled to the power management controller 124. An engine 128 can be coupled to the power management controller 124. A flywheel 116 can be coupled to the power management controller 124. The power management controller can control to what extent the engine can charge the battery 120, such as via a coupling to the generator. The power management controller can control to what extent the generator 122 can charge the battery 120. The power management controller can control to what extent the flywheel 116 can charge the battery 120, such as via a coupling to the generator.

The pedal drivetrain 112 can be coupled to the generator 122 via a multi-speed transmission. The pedal drivetrain 112 can be coupled to the flywheel 116 via a multi-speed transmission. The engine 128 can be coupled to the generator 122 via a multi-speed transmission.

The generator 122 can be coupled to the pedal drivetrain 112 and the motor in a serial hybrid relationship, with the pedal drivetrain 112 free to rotate independent of rotation of the drive wheel. There can be no direct coupling between the pedal drivetrain 112 and the wheel 104. A coupling 122, such as a jack-shaft, can be used to couple the pedal drivetrain 112 to one or more of a flywheel 116, a torque or power sensor 118 and the generator 122.

The power management controller 124 can maintain the battery 120 at a minimum energy level and to control the generator to power the drive wheel 104 while the battery 120 can be maintained at the minimum energy level.

The power management controller 124 can control the generator 122 to provide the variable resistance to pedaling the pedal drivetrain 112. The resistance can vary according to a look-up table. The look-up table can be a user-selected look-up table, such as one selected via the display 126.

The power management controller 124 can control the generator to provide the variable resistance according to automatic feedback. The automatic feedback can be associated with a sensed torque of the pedal drivetrain 112, such as torque sensed using the sensor 118. Thus, harder pedaling can increase pedaling resistance, according to an example. Increase can be according to a variety of pre-programmed curves that can be user-selected.

The traction controller 108 can control power to the drive wheel 104 in association with a sensed torque of the pedal drivetrain 112. The torque can be sensed using the sensor 118. The traction controller 108 can control power to the drive wheel 104 in proportion to a sensed torque of the pedal drivetrain 112. In examples, an application of torque to the pedal drivetrain 112 can apply torque to the drive wheel 104 causing an intuitive feeling of applied torque, as if there was a direct coupling between the pedal train 112 and the drive wheel 104.

The power management controller 124 can control the generator to provide the variable resistance in association with a geological feature of a roadway traversed by the apparatus. The power management controller 124 can control the generator to provide the variable resistance to simulate pedal torque, of the pedal drivetrain 112 that can be associated with a grade. The power management controller 124 can control the generator to provide the variable resistance to simulate pedal torque, of the pedal drivetrain 112 that can be associated with a speed of the apparatus. Grade, speed, and the like can be sensed, such as by sensing with a GPS-based sensor 142. The GPS-based sensor 142 can communicate a geological feature signal to the power management controller 124.

A terminal 132, such as an electrical outlet, can be coupled to the power management controller 124. The terminal 132 can be coupled to the battery 120 to transceive energy with the battery such as via the power management controller 124. An on-board charger 134 can be coupled between the terminal 132 and the battery 120 to transform energy between the terminal 132 and the battery 120.

An engine 128 coupled to the generator and the power management controller 124. The power management controller 124 can control the engine 128 to power the generator to charge the battery 120. The engine 128 can be a four-stroke engine 128. The engine 128 can turn at a speed that can be associated with optimized efficiency.

A targa top can be fixed to the chassis, such as to the top of a body, such as the body in U.S. Patent Publication No. US2013/0081892 to Kronfeld, et al.

A standard bicycle is typically a direct drive vehicle where torque applied by a user to a front sprocket is transferred from the front sprocket to a rear sprocket by a chain or other connecting medium in order to propel the bicycle forward. Stated in another way, the speed and torque at the rear sprocket of the standard bicycle is directly proportional to the speed and torque applied to the front sprocket through a mechanical coupling, such as a chain drive. In contrast to standard bicycles, the vehicle 100 has no direct mechanical coupling between the pedal drivetrain 112 and the wheel 104 to control vehicle motion. The vehicle 100 can include an electrical coupling between a user control input, such as a pedal crank 110, and a prime mover, such as an electrical motor 102, to propel the vehicle 100 in a controllable manner. As used herein, a prime mover can be a device that transforms mechanical energy into electrical energy or electrical energy into mechanical energy. Electrically connecting the user control input to the prime mover, or more specifically, the absence of a mechanical connection between the user control input and prime mover, can offer many advantages in designing vehicle speed control systems. For example, electrically connecting the user control input to the prime mover with appropriate control systems can approximate the performance of a continuously variable transmission (CVT) without the burden of additional weight and mechanical complexity.

A variety of parameters can be used to quantify control input variables that can influence a vehicle output of the vehicle 100. As used herein, the term control input variable can include any parameter that affects the vehicle output of the vehicle 100, such as the torque or speed of the pedal drivetrain 112. In an example, a vehicle output of the vehicle 100 can include, but is not limited to, the vehicle speed of the vehicle 100.

User effort can influence control input variables to affect a vehicle output of the vehicle 100. As used herein, the term user effort can include any characteristic resulting from physical exertion applied by the user to the vehicle 100 including, but are not limited to, the rotational speed of the pedal crank 110, the torque applied to the pedal crank 110 and an angular rotation of a handlebar grip-style throttle mechanism, such as the throttle 117 described in FIGS. 55 and 56. In an example, the rotational speed of the pedal crank 110 can be a control input variable influenced by user effort. For example, when a user applies additional force to a pedal crank 110, such as by 'pedaling harder', the user can increase the rotational velocity of the pedal crank 110 from a first rotational speed to a second rotational speed to affect a change in the speed of the vehicle 100. A control input variable such as torque or speed of the pedal drivetrain 112 can be measured with a torque sensor 118 or speed sensor 119 for use by the power management controller 124.

Other factors unrelated to user effort can influence control input variables to affect a vehicle output of the vehicle 100. In an example, control input variables unrelated to user effort can include, but are not limited to, sensors attached to the vehicle 100 that can sense pitch, roll or yaw such as inclination sensors or GPS-based sensors 142. For example, where the vehicle 100 is operated at a first vehicle speed on a road that transitions from a flat landscape to a terrain with a gradual upslope, an inclination sensor or a GPS-based sensor 142 attached to the vehicle 100 can sense the upslope condition and increase electrical power applied to the wheel motors 102 to compensate for the additional power required to maintain the first vehicle speed. Similarly, where the vehicle 100 is operated at a second vehicle speed on a road that transitions from a flat landscape to a terrain with a gradual downslope, an inclination sensor or a GPS-based sensor 142 attached to the vehicle 100 can sense the downslope condition and decrease electrical power applied to the wheel motors 102 to compensate for the reduced power required to maintain the second vehicle speed.

Electrically connecting a user control input to a prime mover can allow the vehicle 100 to operate in distinct functional modes. Different functional modes can allow a user greater flexibility in the use of vehicle 100.

FIG. 57 shows a functional block diagram of a computing system 300 including a computing device 302 and software applications 314. In an example, software applications 314 can include programs that monitor and control operational characteristics of the vehicle 100. For example, software applications 314 can include, but are not limited to, monitoring the speed of the vehicle 100 or the torque applied to the pedal drivetrain 112 and controlling the amount of pedal resistance experienced by a user.

Figure 59:
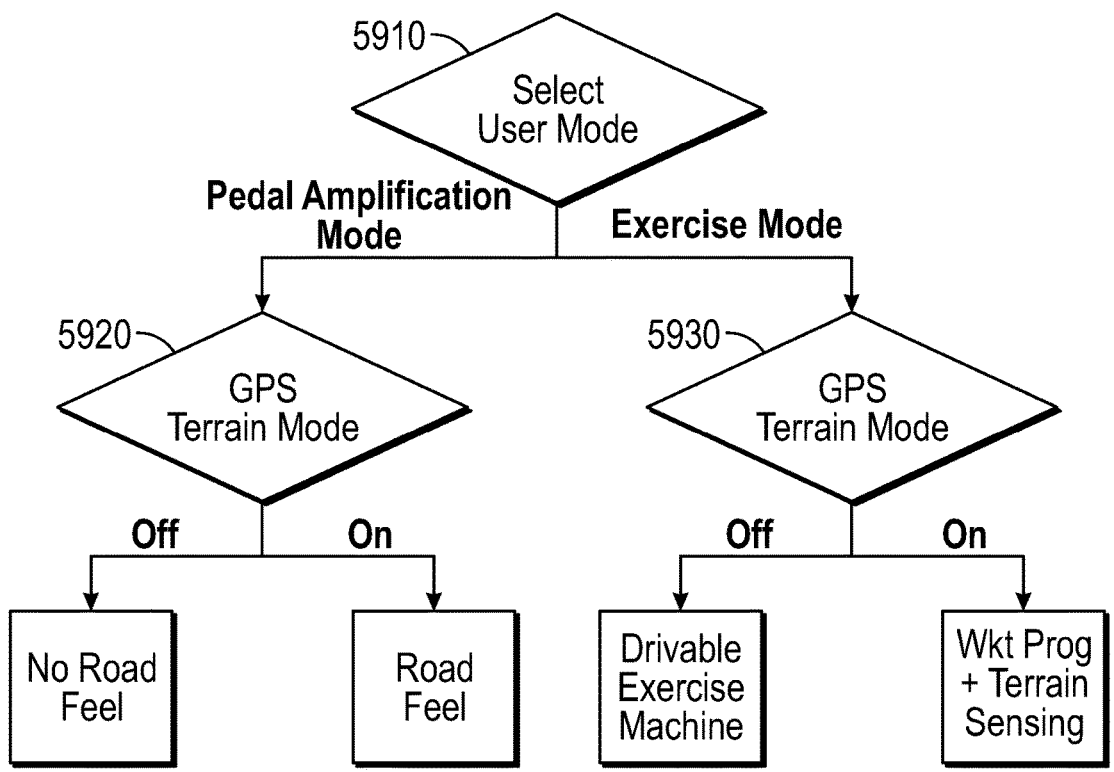
FIG. 59 is a block diagram of an example decision chart to select a mode of operation for the vehicle of the present disclosure.

FIG. 59 shows an example of a functional block diagram illustrating user modes to control operation of the vehicle 100. In an example, operation of the vehicle 100 can include user selection of one of several operational modes, or user modes. In an example, one or more user modes can be programmed into a software application 314. For example, a software application 314 can include, but is not limited to, user operation of the vehicle 100 through selection of either a pedal amplification mode or an exercise mode.

A pedal amplification mode is a functional mode of the vehicle 100 that can control vehicle speed of the vehicle 100 as a function of user effort. In an example, where a user desires to increase the speed of the vehicle 100 from a first vehicle speed to a second vehicle speed where the first vehicle speed is less than the second vehicle speed, the user can achieve the second vehicle speed by increasing the rotational speed of the pedal crank 110 through additional user effort. In an example, the vehicle 100 can amplify the torque and speed generated by a user to cause the vehicle 100 to cruise at highway speeds.

In pedal amplification mode, the vehicle speed of the vehicle 100 can be related to the rotational speed of the pedal drivetrain 112. In an example, the vehicle speed of the vehicle 100 operating in pedal amplification mode can be directly proportional to the rotational speed of the pedal drivetrain 112. For example, where the user imparts a first pedal rotational speed to the pedal drivetrain 112 resulting in a first system speed, doubling the first pedal rotational speed can result in a second system speed that is twice the first system speed.

In an example, the vehicle speed of vehicle 100 can be indirectly proportional to the rotational speed of the pedal drivetrain 112. For example, where a first pedal drivetrain speed results in a first vehicle speed, increasing to a second pedal drivetrain speed can result in a second vehicle speed that is a non-linear function of pedal drivetrain speed. In an example, the non-linear function can include a non-linear mapping of the rotational speed of the pedal drivetrain 112 to a vehicle speed. In an example, the non-linear function can be realized in the traction controller 108 or the power management controller 124.

In an example, the acceleration of the vehicle 100 can be directly proportional to the rate of change of rotational speed of the pedal drivetrain 112 For example, where first and second pedal drivetrain speeds result in first and second vehicle speeds respectively, the system acceleration can be directly proportional to the time taken to change the speed of the pedal drivetrain 112 from a first speed to a second speed.

In an example, the acceleration of the vehicle 100 can be indirectly proportional to the rate of change of rotational speed of the pedal drivetrain 112. For example, where first and second pedal drivetrain speeds result in first and second vehicle speeds respectively, the system acceleration can be a non-linear function of the difference in the first and second pedal drivetrain speeds. In an example, the non-linear function can include a non-linear mapping of the difference in rotational speeds of the pedal drivetrain 112 to vehicle acceleration. In an example, the non-linear function can be realized in the traction controller 108 or the power management controller 124.

In an example, the throttle 117 can control the amount of pedal amplification (or gain) applied to the wheel motors 102 of the vehicle 100. For example, where a user travels on a flat road applying user effort to the vehicle 100 resulting in a first rotational speed and where a first position of the throttle 117 applies a first gain resulting in a first vehicle speed, adjusting the throttle 117 to a second position applies a second gain to the first rotational speed resulting in a second vehicle speed different than the first vehicle speed.

Operation of the vehicle 100 in pedal amplification mode can require users to constantly exert user effort on the pedal cranks 110 in order to maintain a vehicle speed. Thus, the ability of a user to deliver sufficient power to the pedal cranks 110 to maintain a vehicle speed and the fatigue of the user in using the vehicle 100 for long periods of time can become a concern.

In an example, a throttle 117 can be used to supplement the pedal amplification mode of the vehicle 100 to maintain a vehicle speed when a user is unable to apply sufficient power to the pedal drivetrain 112. For example, where a user is unable to maintain a desired speed of the vehicle 100 due to user fatigue, the user can rotate the throttle 117 to supplement the pedal amplification mode mechanism and attain a desired speed of the vehicle 100.

In an example, the user can establish a target vehicle speed where a first portion of the power to maintain the target vehicle speed is realized in user effort and a second portion through a secondary energy source, such as a battery 120 or an engine 128. For example, at the beginning of a trip with the vehicle 100 where a user is not fatigued, a substantial portion of the power required to maintain the target speed can be generated through user effort with the balance of power can be supplied by a secondary source. However, as the trip continues and the user is fatigued, the computing system 300 can sense a reduction in user effort and compensate with power from the secondary source in order to maintain the target speed. In an example, the user can establish a target vehicle speed whereafter the vehicle 100 can measure vehicle speed with a GPS-based sensor 142, sense the user effort applied to the pedal drivetrain 112 and automatically compensate for the difference between target speed and user effort with power from a secondary source.

An exercise mode is a functional mode of the vehicle 100 that can replicate the role of an exercise machine to enhance user well-being. In an example, a user can engage in the exercise mode of the vehicle 100 without influencing the vehicle speed of the vehicle 100. For example, where a user seeks an aerobic workout while traveling in the vehicle 100, switching to exercise mode can deactivate the pedal amplification mode so any user effort against the variable resistance mechanism can be dissipated as heat or, alternatively, used to recharge the battery 120. In a further example, the amount of resistance experienced by the user in working against the variable resistance mechanism can be related to the exercise program selected by the user.

In an example, the exercise mode can engage in the exercise mode of the vehicle 100 and influence the vehicle speed of the vehicle 100. For example, the vehicle 100 can operate in the pedal amplification mode and the exercise mode so that the vehicle speed of the vehicle 100 is a function of user effort.

In an example, the vehicle speed of the vehicle 100 in exercise mode can be influenced by sensors including, but not limited to, GPS-based sensors 142, inclinometers or alternatively, angular rotation of a handlebar grip-style throttle mechanism, such as the throttle 112 described in FIGS. 55 and 56. For example, the user can establish a target vehicle speed whereafter, the vehicle 100 can measure vehicle speed with a GPS-based sensor 142, sense the user effort applied to the pedal drivetrain 112 and automatically compensate for the difference between target speed and user effort with power from a secondary source.

In an example, the variable resistance level presented to a user of the vehicle 100 when operating in exercise mode can be a function of measured parameters, such as user heart rate or calculated parameters, such as caloric burn rate. For example, a user of vehicle 100 can specify a target calorie threshold to expend at a first variable resistance level and after achieving the target calorie threshold, the vehicle 100 can adjust to a second variable resistance level where the second variable resistance level presents a lesser resistance to the user than the first variable resistance level.

As shown in FIG. 59, upon user selection of an exercise mode, a user can exert effort against the variable resistance device for the purposes of enhancing the physical fitness of the user while operating the vehicle 100. In an example, the speed of the vehicle 100 operating in exercise mode can be unrelated to the rotational speed of the pedal drivetrain 112. For example, where the user selects a 'step' workout program in exercise mode, user effort imparted to the pedal drivetrain 112 to overcome the variable resistance can be converted to electrical energy to charge the battery 120 as opposed to influencing the speed of the vehicle 100.

Referring to FIG. 57 operation of the vehicle 100 can include user selection of one of several operational modes programmed into a software application 314. For example, a software application 314 can include user selection of a GPS terrain mode to influence the user experience of the vehicle 100.

In an example, an all-electric mode is a functional mode of the vehicle 100 that can allow a user to operate the vehicle 100 without any physical exertion on the part of the user. For example, where a user does not wish to engage in physical exertion to control the speed of the vehicle 100 (i.e., pedal amplification mode) or improve cardiovascular fitness (i.e., exercise mode), switching the computing system 300 to all-electric mode can allow the vehicle 100 to act as an electric vehicle. In an example, vehicle speed of the vehicle 100 in all-electric mode can be controlled by sensors including, but not limited to, GPS-based sensors 142 or alternatively, angular rotation of a handlebar grip-style throttle mechanism, such as the throttle 112 described in FIGS. 55 and 56.

In another example, the vehicle 100 can be used as an emergency power generator. For example, where the vehicle 100 is stopped, applying user effort to the vehicle 100 can create electricity to charge the battery 120 after which power can be drawn from the battery 120 to power other electrical appliances connected to terminal 132.

FIG. 59 shows a block diagram of an example decision chart illustrating modes of operation of the vehicle 100. In an example, at block 5910, the user has the option to select a pedal amplification mode or an exercise mode. At block 5920 and block 5930, the user has the option to enable a GPS terrain mode. As used herein, the term GPS terrain mode enables the vehicle 100 to incorporate inclination sensors, such as inclinometers or GPS-based sensors 142 into the calculation of variable resistance presented by the pedal drivetrain 112 to a user.

In a first mode of operation, resistance presented by the pedal drivetrain 112 to the user is independent of the grades and slopes associated with a path on which the vehicle 100 is traveling. For example, in pedal amplification mode where the GPS terrain mode is 'off', the user will not experience 'road feel' (i.e., the absence of a variable resistance in the pedal drivetrain 112) as the vehicle travels up and down hills on a path. As a consequence, the vehicle speed of vehicle 100 can be proportional to user effort, such as the speed with which the user turns the pedal drivetrain 112, so that user exertion is equivalent to an accelerator pedal in an automobile.

Pedal sensing speed control can require users to constantly exert effort on the pedal drivetrain 112 in order to maintain a desired speed, so fatigue of the user can become a concern. In an example, a throttle 117 can be used to supplement the pedal sensing speed control mode of the vehicle 100. For example, where a user is unable to maintain a desired speed of the vehicle 100 through exerting effort to turn the pedal drivetrain 112 due to fatigue, the user can adjust the throttle 117 to increase the speed of the vehicle 100 to the speed desired.

In a second mode of operation, resistance presented by the pedal drivetrain 112 to the user is dependent on the grades and slopes associated with a path on which the vehicle 100 is traveling. For example, in pedal amplification mode where the GPS terrain mode is 'on', the user can experience 'road feel' (i.e., the presence of variable resistance in the pedal cranks 110 dependent on the terrain traveled) as the vehicle travels up and down hills on a path, similar to the variable resistance a user can feel when riding a bicycle up and down hills on a path. As a consequence, the vehicle speed of vehicle 100 can be proportional to user effort, such as the speed with which the user turns the pedal drivetrain 112, so that user exertion is equivalent to an accelerator pedal in an automobile.

In a third mode of operation, resistance presented by the pedal drivetrain 112 to the user is governed by an exercise program that is independent of the grades and slopes associated with a path on which the vehicle 100 is traveling. For example, in exercise mode where the GPS terrain mode is 'off', the user can exert effort by turning the pedal cranks 110 against a resistance generated by an exercise program configured to change resistance levels in a pre-determined fashion such as found on stationary exercise machines. As a consequence, the effort expended by the user in turning the pedal cranks 110 against the resistance can be directed to powering the vehicle or charging the battery 120 while the speed of the vehicle can be independently controlled through another device such as the throttle 117.

In a fourth mode of operation, resistance presented by the pedal drivetrain 112 to the user is dependent on the grades and slopes associated with a path on which the vehicle 100 is traveling but independent of the exercise program against which a user is exerting effort. For example, in exercise mode where the GPS terrain mode is 'on', the user can exert effort by turning the pedal cranks 110 against a resistance generated by an exercise program configured to change resistance levels in a pre-determined fashion such as found on stationary exercise machines. Further, as the GPS terrain mode is active, the vehicle 100 can sense the attitude of the vehicle and supply (or restrict) power to the wheel motors 102 as necessary to compensate for variations in vehicle speed. As a consequence, the effort expended by the user in turning the pedal cranks 110 against the resistance can be directed to powering the vehicle or charging the battery 120 while the speed of the vehicle can be automatically controlled through the GPS terrain mode or independently controlled through another device such as the throttle 117.

Figure 60:
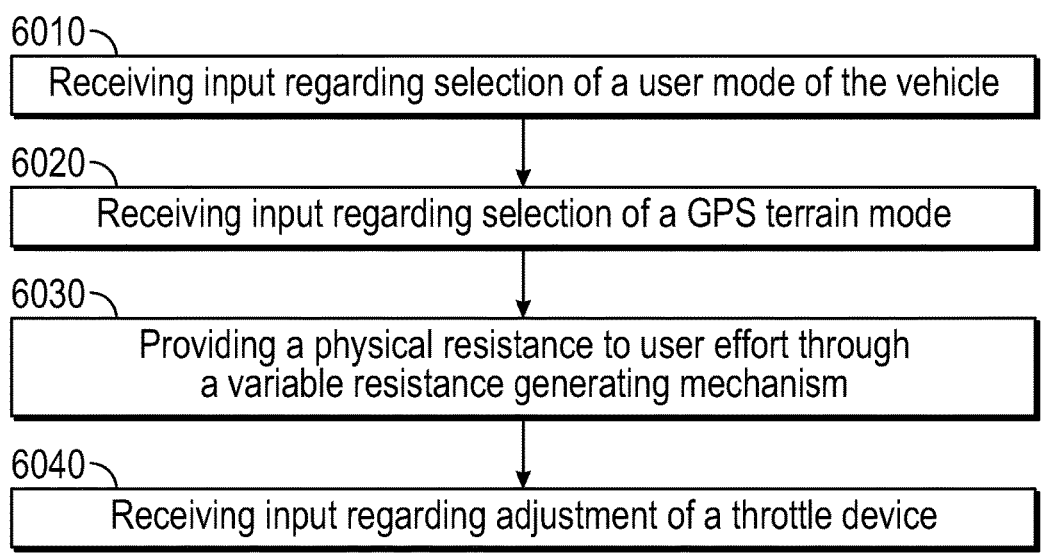
FIG. 60 is a flow chart of an example method of operating a wheeled vehicle.

FIG. 60 illustrates an example method of operating a vehicle 100. In an example where the vehicle 100 is in motion, at block 6010, the vehicle can receive input from a user regarding selection of a user mode. For example, the user can select a pedal amplification mode, an exercise mode or a mode incorporating both pedal amplification and exercise modes. At block 6020, the vehicle can receive input from a user regarding selection of a GPS terrain mode. For example, the user can activate the GPS terrain mode (i.e., GPS terrain mode 'on') in order to experience 'road feel'. At block 6030, the vehicle can provide a physical resistance to work against user effort applied to the vehicle 100. For example, after receiving input from a user selecting exercise mode, the vehicle 100 can activate a pre-programmed exercise workout profile that controls resistance of a variable resistance generating mechanism, such as an electrical generator. Recognizing that the user can experience fatigue while operating vehicle 100, at block 6040, the vehicle 100 can receive input from regarding vehicle speed. For example, where a fatigued user is unable to generate sufficient user effort to maintain a desired speed, the user can adjust a throttle 112 to increase the speed of vehicle 100.

Additional Embodiments

An electrically propelled vehicle comprising: a body configured to hold at least one human, a drive train, a power source, a steering system, a braking system, pedals allowing for power input by a human, and a computing system including a graphical interface.

The electrically propelled vehicle of the previous paragraph, wherein the power supply is at least one battery.

The electrically propelled vehicle of the previous paragraphs, wherein the braking system is a regenerative braking system.

The electrically propelled vehicle of the previous paragraphs, wherein the power supply is configured to be recharged by alternating current.

The electrically propelled vehicle of the previous paragraphs, wherein the computing system is configured to increase and decrease an amount of resistance provided by the pedals.

The electrically propelled vehicle of the previous paragraphs, further comprising a solar panel configured to intake solar energy and provide electricity to the power supply.

The electrically propelled vehicle of the previous paragraphs, wherein the computing system is configured to provide pedal resistance according to at least one pre-programmed exercise program.

The electrically propelled vehicle of the previous paragraphs, wherein the computing system is configured to provide pedal resistance according to a custom exercise program.

An apparatus, comprising a chassis with a drive wheel, a pedal drive train coupled to the chassis, a generator coupled to the pedal drive train to receive energy from the pedal drive train, a battery coupled to the generator to receive energy from the generator, a motor coupled to the drive wheel, a traction controller coupled to the motor and the battery to power the motor with the battery, and a power management controller to control the generator to apply variable torsional resistance to the pedal drive train, The apparatus of the previous paragraph, wherein the generator is coupled to the pedal drive train and the motor in a serial hybrid relationship, with the pedal drive train free to rotate independent of rotation of the drive wheel.

The apparatus of the previous paragraphs, wherein the traction controller includes a regenerative braking circuit configured to apply a braking torque to the drive wheel and to charge the battery.

The apparatus of the previous paragraphs, wherein the regenerative braking circuit is to apply a braking torque to a plurality of wheels including the drive wheel.

The apparatus of the previous paragraphs, wherein the traction controller is to control drive torque to provide a desired slip at the drive wheel.

The apparatus of the previous paragraphs, wherein the traction controller is to control stability of the chassis with respect to a road surface travelled by the chassis.

The apparatus of the previous paragraphs, comprising a terminal coupled to the power management controller to transceive energy with the battery via the power management controller.

The apparatus of the previous paragraphs, comprising an on-board charger coupled between the terminal and the battery to transform energy between the terminal and the battery.

The apparatus of the previous paragraphs, wherein the power management controller is to control the generator power the terminal with the pedal drive train.

The apparatus of the previous paragraphs, wherein the power management controller is to control the generator to power the terminal with only the pedal drive train.

The apparatus of the previous paragraphs, wherein the power management controller is to control the generator to provide the variable resistance according to a look-up table.

The apparatus of the previous paragraphs, wherein the look-up table is a user-selected look-up table.

The apparatus of the previous paragraphs, wherein the power management controller is to control the generator to provide the variable resistance according to automatic feedback.

The apparatus of the previous paragraphs, wherein the automatic feedback is associated with a sensed torque of the pedal drive train.

The apparatus of the previous paragraphs, wherein the traction controller is to control power to the drive wheel in association with a sensed torque of the pedal drive train.

The apparatus of the previous paragraphs, wherein the traction controller is to control power to the drive wheel in proportion to a sensed torque of the pedal drive train.

The apparatus of the previous paragraphs, wherein the traction controller is to control power to the drive wheel in association with a sensed torque of the pedal drive train.

The apparatus of the previous paragraphs, wherein the traction controller is to control power to the drive wheel in proportion to a sensed torque of the pedal drive train.

The apparatus of the previous paragraphs, comprising an engine coupled to the generator and the power management controller, wherein the power management controller is to control the engine to power the generator to charge the battery.

The apparatus of the previous paragraphs, wherein the engine is a four-stroke engine.

The apparatus of the previous paragraphs, wherein the engine is to turn at a speed that is associated with optimized efficiency.

The apparatus of the previous paragraphs, wherein the power management controller is to control the generator to provide the variable resistance in association with a geological feature of a roadway traversed by the apparatus.

The apparatus of the previous paragraphs, wherein the power management controller is to control the generator to provide the variable resistance to simulate pedal torque, of the pedal drive train, that is associated with a grade.

The apparatus of the previous paragraphs, wherein the power management controller is to control the generator to provide the variable resistance to simulate pedal torque, of the pedal drive train, that is associated with a speed of the apparatus.

The apparatus of the previous paragraphs, comprising a taiga top fixed to the chassis.

The apparatus of the previous paragraphs, wherein the power management controller is to maintain the battery at a minimum energy level and to control the generator to power the drive wheel while the battery is maintained at the minimum energy level.

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A vehicle, comprising:
   a vehicle frame including a wheel;
   an electric motor, connected to the wheel, configured to rotate the wheel and drive the vehicle at a speed;
   an electric power source, in communication with the electric motor, configured to supply electric power to the electric motor;
   a pedal generator system including a pedal drivetrain to receive user effort and a generator connected to the pedal drivetrain and in electrical communication with the electric power source to convert the user effort into electric power, configured to generate variable resistance against user effort applied to the pedals; and,
   a computing system including a control input sensor, attached to the vehicle, configured to
      control vehicle speed based on an indication of a control input variable sensed by the control input sensor and present a variable pedal resistance to the user, wherein the variable pedal resistance is independent of the control input variable.

2. The vehicle of claim 1, further comprising an engine, coupled to the generator, configured to supply mechanical effort to the generator.

3. The vehicle of claim 2, wherein the engine and the pedal drivetrain are coupled to the generator in a serial hybrid relationship.

4. The vehicle of claim 1, wherein the control input sensor configured to sense an indication of a control input variable includes at least one of a torque sensor configured to sense an indication of user-applied pedal drivetrain torque, a rotational speed sensor configured to sense an indication of user-applied pedal rotational speed, a GPS-based sensor configured to sense an indication of vehicle motion, or an inclination sensor configured to sense an indication of grades and slopes of the path traveled by the vehicle.

5. The vehicle of claim 4, wherein the control input sensor is the torque sensor, attached to the pedal generator system, configured to sense an indication of torque generated by a user pedaling the vehicle.

6. The vehicle of claim 4, wherein the control input sensor is the rotational speed sensor, attached to the pedal generator system, configured to sense an indication of the pedal generator rotational speed generated by a user pedaling the vehicle.

7. The vehicle of claim 4, wherein the control input sensor is the GPS-based sensor, in communication with the computing system, configured to sense an indication of vehicle motion, including at least one of vehicle displacement, velocity, or acceleration.

8. The vehicle of claim 4, wherein the control input sensor is the inclination sensor, configured to sense an indication of the grades and slopes of the path of the vehicle.

9. The vehicle of claim 1, further comprising an exercise mode module, running on the computing system, configured to present variable pedal resistance to the user based on a look-up table.

10. The vehicle of claim 1, further comprising a power management controller, in electrical communication with the electric motor, the electric power source, the pedal generator system, and the computing system, configured to control the flow of electric power between the electric motor, the electric power source, the pedal generator system, and the computing system.

11. The vehicle of claim 10, further comprising an electronically controlled variable resistance recharging system (ECVRR), in communication with the power management controller, configured to control the flow of electric power from the pedal generator system to the electric power source to present a variable pedal resistance to the user.

12. The vehicle of claim 10, further comprising a target speed module, running on the computing system that receives an indication of vehicle speed and an indication of the control input variable, configured to maintain a user-selected target speed independent of the indication of the control input variable.

13. The vehicle of claim 10, further comprising a regenerative braking motor controller, in communication with the power management controller, configured to transfer electric power generated by the electric motor to the electric power source during a vehicle braking event.

14. The vehicle of claim 1, wherein the computing system includes a GPS terrain mode module, running on a computing device, configured to present variable pedal resistance to the user at least partially dependent upon the control input variable.

15. The vehicle of claim 14, wherein the control input sensor to sense a control input variable to generate variable pedal resistance presented to the user at least partially dependent on the control input variable includes at least one of a torque sensor configured to sense an indication of torque, a rotational speed sensor configured to sense an indication of pedal rotational speed, a GPS-based sensor configured to sense an indication of vehicle motion, or an inclination sensor configured to sense an indication of grades and slopes of the path traveled by the vehicle.

16. The vehicle of claim 15, wherein the control input sensor is a torque sensor and the control input variable is the indication of torque.

17. The vehicle of claim 15, wherein the control input sensor is a rotational speed sensor and the control input variable is an indication of pedal rotation speed.

18. The vehicle of claim 15, wherein the control input sensor is a GPS-based sensor and the control input variable is an indication of vehicle motion, including at least one of vehicle displacement, speed, or acceleration.

19. The vehicle of claim 15, wherein the control input sensor is an inclination sensor and the control input variable is an indication of grades and slopes of the path traveled by the vehicle.

20. The vehicle of claim 1, wherein the variable pedal resistance presented to the user independent on at least one of a user heart rate or a caloric burn rate.

* * * * *